(12) United States Patent
Arbore et al.

(10) Patent No.: US 6,844,962 B2
(45) Date of Patent: *Jan. 18, 2005

(54) S-BAND LIGHT SOURCES USING ERBIUM-DOPED FIBER WITH DEPRESSED CLADDING

(75) Inventors: Mark A. Arbore, Los Altos, CA (US); Yidong Zhou, Santa Clara, CA (US); Jeffrey D. Kmetec, Palo Alto, CA (US)

(73) Assignee: Lightwave Electronics, Mountain View, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 10/194,680

(22) Filed: Jul. 12, 2002

(65) Prior Publication Data

US 2003/0169486 A1 Sep. 11, 2003

Related U.S. Application Data

(63) Continuation-in-part of application No. 10/095,303, filed on Mar. 8, 2002.

(51) Int. Cl.[7] .............................................. H01S 3/00

(52) U.S. Cl. ................................. 359/341.1; 385/127

(58) Field of Search ....................... 359/341.1; 385/127

(56) References Cited

U.S. PATENT DOCUMENTS

| | | |
|---|---|---|
| 4,515,436 A | 5/1985 | Howard et al. |
| 4,764,933 A | 8/1988 | Kozlovsky et al. |
| 5,056,888 A | 10/1991 | Messerly et al. |

(List continued on next page.)

OTHER PUBLICATIONS

L.G. Cohen et al., "Radiating Leaky–Mode Losses in Single–Mode Lightguides with Depressed–Index Claddings," IEEE Journal of Quantum Electronics, vol. QE–18, No. 10, Oct. 1982, pp. 1467–1472.

Ishikawa et al., "Novel 1500 nm–Band EDFA with Discrete Raman Amplifier," ECOC–2001, Post Deadline Paper.

Stolen et al, "Short W–Tunneling Fibre Polarizers," Electronics Letters, vol. 24, 1988, pp. 524–525.

Tadashi Kasamatsu, et al., "Gain–Shifted Dual–Wavelength–Pumped Thulium–Doped–Fiber Amplifier for WDM Signals in the 1.48–1.51–$\mu$m Wavelength Region," IEEE Photonics Technology Letters, vol. 13, No. 1, Jan. 2001, p. 31–33.

*Primary Examiner*—Mark Hellner
(74) *Attorney, Agent, or Firm*—Lumen Intellectual Property Services, Inc.

(57) ABSTRACT

A source that employs an Erbium-Doped Fiber Amplifier (EDFA) for generating light in an S-band of wavelengths. The EDFA uses a fiber having a core with a core cross section surrounded by a depressed cladding with a depressed cladding cross section and a secondary cladding with a secondary cladding cross section. A pump source is provided for pumping the Erbium contained in the core of the fiber to a high relative inversion D, such that the Erbium exhibits positive gains in the S-band and high gains in a long wavelength band longer than the S-band. The core cross-section, the depressed cladding cross-section, and the refractive indices $n_o$, $n_1$, and $n_2$ are selected to produce losses at least comparable to the high gains in the long wavelength band and losses substantially smaller than the positive gains in the S-band. The source uses the amplified spontaneous emission (ASE) produced by the EDFA to generate broadband light and/or narrowband light with the aid of a wavelength selecting mechanism that selects an output wavelength of the light within the ASE emission spectrum of the EDFA.

25 Claims, 10 Drawing Sheets

U.S. PATENT DOCUMENTS

| | | |
|---|---|---|
| 5,260,823 A | 11/1993 | Payne et al. |
| 5,392,154 A | 2/1995 | Chang et al. |
| 5,452,116 A | 9/1995 | Kirkby et al. |
| 5,473,714 A | 12/1995 | Vengsarkar |
| 5,673,342 A | 9/1997 | Nelson et al. |
| 5,696,782 A | 12/1997 | Harter et al. |
| 5,801,858 A | 9/1998 | Roberts et al. |
| 5,818,630 A | 10/1998 | Fermann et al. |
| 5,867,305 A | 2/1999 | Waarts et al. |
| 5,880,877 A | 3/1999 | Fermann et al. |
| 5,892,615 A | 4/1999 | Grubb et al. |
| 5,930,030 A | 7/1999 | Scifres |
| 5,933,271 A | 8/1999 | Waarts et al. |
| 6,021,141 A | 2/2000 | Nam et al. |
| 6,049,417 A | 4/2000 | Srivastava et al. |
| 6,081,369 A | 6/2000 | Waarts et al. |
| 6,118,575 A | 9/2000 | Grubb et al. |
| 6,154,321 A | 11/2000 | Melville et al. |
| 6,181,465 B1 | 1/2001 | Grubb et al. |
| 6,212,310 B1 | 4/2001 | Waarts et al. |
| 6,278,816 B1 | 8/2001 | Keur et al. |
| 6,301,271 B1 | 10/2001 | Sanders et al. |
| 6,307,994 B1 | 10/2001 | Paek et al. |
| 6,445,494 B1 | 9/2002 | Nilsson et al. ........... 359/341.1 |
| 6,556,757 B2 | 4/2003 | Ellison et al. .............. 385/127 |
| 6,563,995 B2 * | 5/2003 | Kane et al. .................. 385/127 |

* cited by examiner

S-BAND LIGHT SOURCES USING ERBIUM-DOPED FIBER WITH DEPRESSED CLADDING

RELATED APPLICATIONS

This application is a continuation-in-part of U.S. application Ser. No. 10/095,303 filed on Mar. 8th, 2002.

FIELD OF THE INVENTION

The present invention relates generally to light sources employing Erbium-doped fibers to produce broadband and narrowband light in the S-band.

BACKGROUND OF THE INVENTION

There exists a need for reliable sources of light in a short wavelength range commonly referred to as the "S-band" or "short-band" covering wavelengths between about 1425 nm and about 1525 nm. More specifically, what is required are wideband or broadband sources and narrowband sources of light in the S-band. Such sources are needed for various applications, including testing of optical components, measurements of optical system performance and generation of signals in the S-band.

In the field of testing, it is important to provide reliable S-band sources for examining the performance of filters, multiplexers, fiber Bragg gratings, circulators, isolators, arrayed waveguide gratings (AWGs), thin film filters, couplers, variable optical attenuators, detectors, receivers, amplifiers as well as various other active and passive optical components. Many of these components are used in telecommunications networks intended to operate in the S-band, where one of the important measurements is the insertion loss as a function of wavelength.

A common source of light is the tunable diode laser, which typically provides high power and high spectral resolution. Unfortunately, tunable diode lasers with suitable wide tuning ranges are costly. Tunable fiber lasers are also frequently used for testing applications because they too are able to provide high optical power over wide tuning ranges. Tunable fiber lasers tend to be somewhat lower cost than tunable diode lasers, though with only moderate (but often more than adequate) spectral resolution. A third type of optical source that is commonly used is an amplified spontaneous emission (ASE) or broadband source. ASE sources offer significantly lower cost, but with poorer spectral resolution. Since the ASE source produces emission over the entire wavelength range simultaneously, it only produces a small amount of power at each wavelength. Hence, the sensitivity and dynamic range of the measurements are limited. Also, the spectral resolution of the measurement is typically limited by the resolution of the optical spectrum analyzer that is used in conjunction with the ASE source. All of these types of optical sources are useful for various applications in addition to insertion loss measurements of telecommunications components.

In general, all of the above-mentioned types of optical sources are commercially available at wavelengths longer than those covered by the S-band, e.g., throughout the C-band and the L-band. The tunable diode laser is also available for the S-band, for example from about 1450 nm to about 1530 nm. However, tunable fiber lasers and ASE sources are not currently available in the S-band at costs comparable to those for the C-band or L-band. That is because of the lack of suitable S-band fiber amplifiers, e.g., Erbium-doped fiber amplifiers (EDFAs) or other suitable alternatives.

Specifically, in producing an EDFA for the S-band the relatively high losses and low gains over the S-band render the selection of fiber and the design of the amplifier system very difficult. In fact, the problems are so severe that the prior art teaches interposition of external filters between EDFA sections to produce an S-band EDFA. For example, Ishikawa et al. disclose a method of fabricating an S-band EDFA by cascading five stages of silica-based EDFA and four ASE suppressing filters in Ishikawa et al., "Novel 1500 nm-Band EDFA with discrete Raman Amplifier", ECOC-2001, Post Deadline Paper. In Ishikawa et al.'s experimental setup, the length of each EDFA is 4.5 meters. The absorption of each suppressing filter at 1.53 $\mu$m is about 30 dB and the insertion losses of each suppressing filter at 1.48 $\mu$m and 0.98 $\mu$m are about 2 dB and 1 dB respectively. The pumping configuration is bi-directional, using a 0.98 $\mu$m wavelength to keep a high inversion of more than $D \geq 0.7$ (D, relative inversion). The forward and backward pumping powers are the same and the total pumping power is 480 mW. Ishikawa et al. show a maximum gain of 25 dB at 1518.7 nm with 9 dB gain tilt.

Yet another example of an approach using a number of filters at discrete locations in a wide band optical amplifier is taught by Srivastava et al. in U.S. Pat. No. 6,049,417. In this approach the amplifier employs a split-band architecture where the optical signal is split into several independent sub-bands, which then pass in parallel through separate branches of the optical amplifier. The amplification performance of each branch is optimized for the sub-band that traverses it.

Unfortunately, Ishikawa's and Srivastava's methods are relatively complicated and not cost-effective, as they require a number of filters. Specifically, in the case of Ishikawa five EDFAs, four ASE suppressing filters and high pump power are required. Also, each of the ASE suppressing filters used by either method introduces an additional insertion loss of 1–2 dB. The total additional insertion loss is thus about 4–8 dB.

Another approach to providing amplification in the S-band has focused on fiber amplifiers using Thulium as the lasing medium doped into a Fluoride fiber core (TDFAs). See, for example, "Gain-Shifted Dual-Wavelength-Pumped Thulium-Doped-Fiber Amplifier for WDM Signals in the 1.48–1.51-$\mu$m Wavelength Region" by Tadashi Kasamatsu, et. al., in IEEE Photonics Technology Letters, Vol. 13, No. 1, January 2001, pg. 31–33 and references therein. While good optical performance has been obtained using TDFAs, this performance has only been possible using complex, non-standard and/or expensive pumping schemes. Also, TDFAs suffer from the problems inherent to their Fluoride fiber host material, namely high fiber cost, poor reliability and difficulty splicing to standard silica fibers used elsewhere in the amplifier system.

Still other approaches to producing amplification systems based on rare-earth doped fiber amplifiers and cascaded amplifiers or pre-amplifiers followed by amplifiers are described in U.S. Pat. Nos. 5,867,305; 5,933,271 and 6,081,369 to Waarts et al. and in U.S. Pat. No. 5,696,782 to Harter et al. The teachings in these patents focus on deriving high peak power pulses at high energy levels. The amplifiers described in these patents are not suitable for producing broadband and narrowband sources for the S-band.

In view of the above, it would be an advance in the art to provide low-cost, reliable narrowband and broadband sources of light in the S-band. In particular, it would be an advance in the art to provide S-band sources that can be used for testing optical components, measuring the performance of optical components and generating signals in the S-band.

OBJECTS AND ADVANTAGES

It is a primary object of the present invention to provide reliable narrowband and broadband sources of light in the S-band of wavelengths. Specifically, it is an object of the invention to provide such sources by employing Er-doped fibers or Erbium-doped fiber amplifiers (EDFAs).

These and numerous other advantages of the present invention will become apparent upon reading the following description.

SUMMARY

The objects and advantages of the invention are achieved by a source generating light in an S-band of wavelengths using a fiber having a core doped with Erbium. The fiber core has a certain cross section and a refractive index $n_0$. The fiber's core is surrounded by a depressed cladding having a depressed cladding cross-section and a refractive index $n_1$. Furthermore, the fiber has a secondary cladding surrounding the depressed cladding. The secondary cladding has a secondary cladding cross-section and a refractive index $n_2$. A pump source is provided for pumping the Erbium contained in the core to a high relative inversion D, such that the Erbium exhibits positive gains in the S-band and high gains in a long wavelength band longer than the S-band. The core cross-section, the depressed cladding cross-section, and the refractive indices $n_0$, $n_1$, and $n_2$ are selected to produce losses at least comparable to the high gains in the long wavelength band and losses substantially smaller than the positive gains in the S-band.

When using the source as a narrowband source a wavelength selecting mechanism is provided for selecting an output wavelength of the light. This mechanism can be a feedback mechanism such as a fiber Bragg grating. In other embodiments the wavelength selecting mechanism is a filter selected from the group consisting of tilted etalons, strain-tuned fiber Bragg gratings, temperature-tuned fiber Bragg gratings, interferometers, arrays waveguide gratings, diffraction gratings and tunable coupled cavity reflectors. Alternatively, or in combination with the feedback mechanism or filter an additional pump source adjustment for tuning the high relative inversion D can be used to select the output wavelength. In yet another alternative, or in combination with the previous mechanism or mechanisms, a coiling diameter of the fiber can be used to select the output wavelength. The coiling diameter can be constant or variable, e.g., it can be continuously variable.

The fiber of the source can be placed within an optical cavity, e.g., in cases where it is desired that the fiber operate as a laser for producing light at a specific narrow output wavelength. Preferably the cavity is a ring cavity.

In one embodiment of the source, a master oscillator is used for seeding the fiber. The master oscillator can be any suitable optical source such as a distributed feedback laser, a Fabry-Perot laser, an external cavity diode laser, a distributed Bragg reflector laser, a vertical cavity surface emitting laser, a semiconductor laser, a fiber laser or a broadband source.

In a preferred embodiment, the fiber is broken up into two sections. The first section of the fiber has a first coiling diameter and the second section has a second coiling diameter larger than the first coiling diameter. The first section, whose emission spectrum is centered at a shorter wavelength, is positioned before the second section whose emission spectrum is centered at a longer wavelength. In this configuration the output from the first section is used to seed the second section. In some embodiments an isolator is installed between the two sections.

In another embodiment the first section is designed such that the core cross-section, the depressed cladding cross-section, and the refractive indices $n_o$, $n_1$, and $n_2$ produce a first cutoff wavelength $\lambda_{c1}$. Meanwhile, the core cross-section, the depressed cladding cross-section, and the refractive indices $n_o$, $n_1$, and $n_2$ in the second section are designed to produce a second cutoff wavelength $\lambda_{c2}$ that is longer than the first cutoff wavelength $\lambda_{c1}$. In this embodiment the first section produces an emission spectrum centered at a shorter wavelength and the second section produces an emission spectrum centered at a longer wavelength. Once again, the first section is positioned before the second section for seeding the second section. An isolator can be installed between the two sections in this embodiment.

The pump source for pumping the Erbium in the core of the fiber is preferably a laser diode. For example, one can use a laser diode providing pump light at about 980 nm. In accordance with the method of the instant invention it is preferable to use a counter-propagating pumping arrangement to pump the Erbium. In other words, the pump light is counter-propagating with respect to the output light.

The source of the invention can be used for testing and measuring purposes as well as for generating output light in the S-band. The source can be operated in a continuous mode or in a pulsed mode, as desired. The output light generated by the fiber can also be combined with light outside the S-band, e.g., with light in the C- and L-bands.

A detailed description of the invention and the preferred and alternative embodiments is presented below in reference to the attached drawing figures.

DETAILED DESCRIPTION

Figure 1:
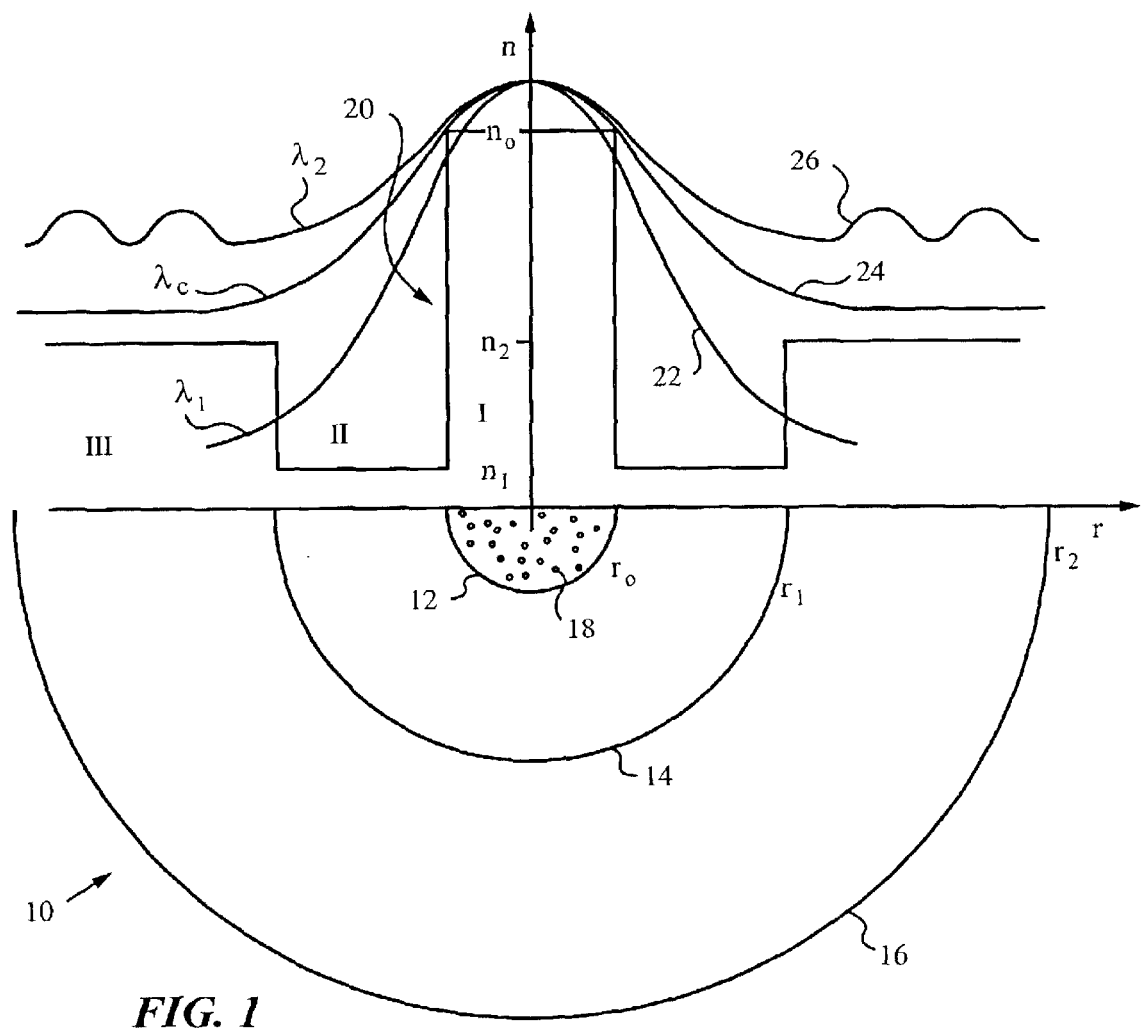
FIG. 1 is a diagram illustrating in cross-section a fiber amplifier for amplifying signals in the S-band of wavelengths according to the invention.
Figure 2:
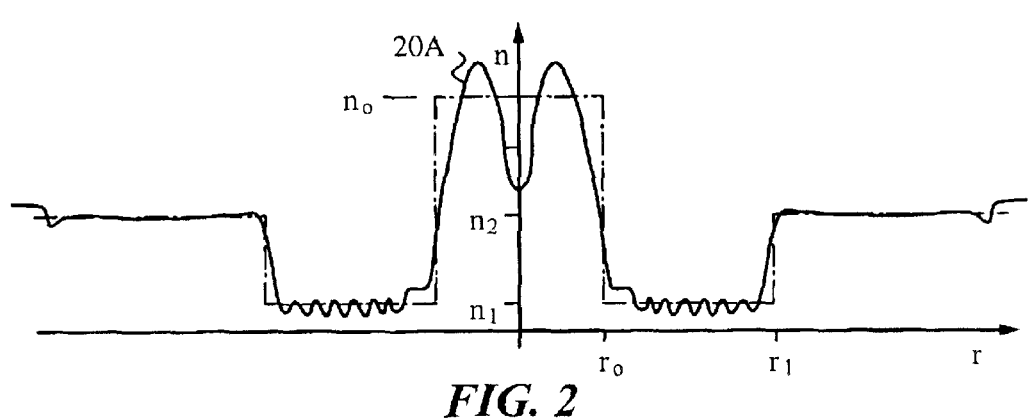
FIG. 2 is a graph illustrating a typical index profile in the fiber of FIG. 1.

The sources of light in the S-band of wavelengths using Erbium-doped fiber amplifiers (EDFAs) will be best understood by first reviewing the principles of EDFAs fabricated in a depressed cladding or W-profile fiber 10 as illustrated in FIGS. 1–2. FIG. 1 is a diagram illustrating a portion of a cross-section of fiber 10 having a core 12 surrounded by a depressed cladding 14. Depressed cladding 14 is surrounded by a secondary cladding 16. Core 12 has a circular cross-section, as do depressed cladding 14 and secondary cladding 16. A region I associated with core 12 extends from $0 \leq r \leq r_0$, depressed cladding 14 and secondary cladding 16 occupy regions II, III extending between $r_0 \leq r \leq r_1$ and $r \geq r_1$. Core 12 has an index of refraction $n_o$, depressed cladding 14 has an index of refraction $n_1$ and secondary cladding 16 has an index of refraction $n_2$. The graph positioned above the partial cross-section of fiber 10 illustrates an average index profile 20 defining a W-profile in fiber 10. In the present embodiment fiber 10 is a single mode fiber for wavelengths within the S-band.

Ions of the rare earth element Erbium 18 are doped into core 12 of fiber 10. Erbium 18 acts as a lasing medium and exhibits high gains in a long wavelength band including the C- and L-bands. Erbium 18 also has positive gains in a short or S-band of wavelengths shorter than the wavelengths in the C- and L-bands. Specifically, when pumped to a high relative inversion D, the high gains of Erbium 18 in the long wavelength band cause amplified spontaneous emissions (ASE) or lasing which reduces the population inversion of Erbium 18 and thus reduces the positive gains in the S-band. Nevertheless, the W-index profile 20 enables fiber 10 to effectively amplify signals in the S-band. This is accomplished by selecting the core cross-section, the depressed cladding cross-section, and the refractive indices $n_o$, $n_1$, and $n_2$ to produce losses at least comparable to the high gains in the long wavelength band and losses substantially smaller than the positive gains in said S-band. The principles of this selection are explained below.

FIG. 2 illustrates a W-profile 20A as is obtained with normal manufacturing techniques. For the purposes of the invention it is sufficient that the radially varying index of core 12 have an average value equal to $n_o$. Likewise, it is sufficient that indices of depressed cladding 14 and secondary cladding 16 average out to the values $n_1$ and $n_2$. The average index $n_o$ of core 12 is significantly higher than index $n_1$ of depressed cladding 14 and index $n_2$ of secondary cladding 16. A selection of appropriate values of indices $n_o$, $n_1$, $n_2$ and radii $r_o$, $r_1$, $r_2$ is made to have a fundamental mode cutoff wavelength $\lambda_c$ between the S-band and the long wavelength band including the C- and L-bands. In particular, cutoff wavelength $\lambda_c$ is preferably set at about 1530 nm. Thus, a signal propagating in the fundamental mode at a wavelength smaller than $\lambda_c$, i.e., in the S-band is retained in core 12. Meanwhile, a signal propagating in fundamental mode at wavelength $\lambda_c$ or at a longer wavelength, i.e., in the C- and L-bands is lost to secondary cladding 16 over a short distance.

Fundamental mode cutoff wavelength $\lambda_c$ for fiber 10 is set in accordance with selection rules for cross-sections and refractive indices $n_o$, $n_1$ and $n_2$ of fiber 10 as derived from Maxwell's equations. In the weak guiding approximation (which is valid when the indices of refraction of core 12 and claddings 14, 16 are all relatively close to each other), the Maxwell vector equations can be replaced with a scalar equation. The scalar $\psi$ represents the strength of the transverse electric field in the fiber. For more information, see for example G. Agrawal, "Nonlinear Fiber Optics" (Academic, San Diego, 1995), D. Marcuse, "Light Transmission Optics" (Van Nostrand, Princeton, 1972), and D. Marcuse, "Theory of Dielectric Optical Waveguides" (Academic, New York, 1974).

For convenience, let us define the following parameters:

$$u_0 = \sqrt{n_o^2 - n_2^2} \text{ and } u_1 = \sqrt{n_2^2 - n_1^2}. \qquad (1)$$

The scalar field $\psi$ inside fiber 10 satisfies a wave equation whose solutions are Bessel functions and modified Bessel functions. For the fundamental mode supported by fiber 10, inside core 12 is thus:

$$\psi = J_0(\kappa r), \ 0 \leq r \leq r_0 (\text{region I}) \qquad (2)$$

where $\kappa$ is an eigenvalue that needs to be determined, and $J_0$ is the zeroth Bessel's function.

Inside depressed cladding 14, the scalar field $\psi$ is:

$$\psi = AK_0(\beta r) + BI_0(\beta r), \ r_0 \leq r \leq r_1 (\text{region II}) \qquad (3)$$

where A and B are constants to be determined, $\beta^2 = (u_0^2 + u_1^2)(2\pi/\lambda)^2 - \kappa^2$, and $K_0$ and $I_0$ are the modified Bessel's functions. Here $\lambda$ is the vacuum wavelength of the light.

In secondary cladding 16, we obtain:

$$\psi = CK_0(\gamma r), \ r \geq r_1 (\text{region III}) \qquad (4)$$

Here C is another constant, and $\gamma^2 = u_0^2 (2\pi/\lambda)^2 - \kappa^2$. A, B, C, and $\kappa$ are found using the boundary conditions, which require that $\psi$ and its first derivative are both continuous at $r_0$ and $r_1$.

It can be shown that fundamental mode cutoff wavelength $\lambda_c$ is a wavelength $\lambda$ at which $\gamma = 0$. (See for example, Cohen et al., IEEE J. Quant. Electron. QE-18 (1982) 1467–1472.)

For additional convenience, let us define the following parameters:

$$x = \frac{2\pi u_0 r_0}{\lambda_c}, \ \rho = u_1/u_0, \ s = r_1/r_0. \qquad (5)$$

Now, fundamental mode cutoff wavelength $\lambda_c$ can be determined if parameter x is determined. That determination can be made with the aid of algebra known to a person skilled in the art, since parameter x is the root of the following equation:

$$\rho J_0(x) K_1(\rho s x) I_1(\rho s x) - \rho J_0(x) I_1(\rho x) K_1(\rho s x) - J_1(x) K_1(\rho s x) I_0(\rho x) - J_1(x) I_1(\rho s x) K_0(\rho x) = 0. \qquad (6)$$

Three observations should be made regarding the parameter x. First, x does not exist for all values of s and $\rho$. For example, for ρ=1 and s≤√2, there is no x that satisfies Eq. (6). This means that all wavelengths are guided in core 12 in this regime. The criterion that Eq. (6) have a solution is:

$$s^2 \geq 1 + 1/\rho^2. \tag{7}$$

Second, for practical applications x cannot be too small. This is because, according to Eq. (5), the parameter x is proportional to radius $r_0$ of core 12, and the radius has to be large enough that it is easy to couple light into and out of core 12. (A smaller core 12 also makes the nonlinear effects stronger, which is often a disadvantage.) Therefore, since $x = 2\pi u_0 r_0 / \lambda_c$, preferably x≧1. This implies that ρ≧0.224 or, in terms of the refractive indices $$\sqrt{(n_2^2 - n_1^2)/(n_o^2 - n_2^2)} \geq 0.224.$$

Third, it is evident from Eq. 7 that for larger values of s, the value of x only weakly depends on s. Thus it is advantageous to have a fiber in this region of parameter space, since a manufacturing flaw producing an error in s will have a small effect on the value of fundamental mode cutoff wavelength $\lambda_c$. Therefore, it is convenient to use the rule s≧1+1/ρ, or in terms of the refractive indices:

$$\frac{r_1}{r_o} \geq 1 + \sqrt{(n_o^2 - n_2^2)/(n_2^2 - n_1^2)}. \tag{8}$$

The selection of cross sections and refractive indices of core 12, depressed cladding 14 and outer cladding 16 is guided by the above rules in setting the appropriate fundamental mode cutoff wavelength $\lambda_c$. First, $\lambda_c$ is pre-selected, e.g. at a wavelength close to 1530 nm, and then convenient values are selected for $u_o$ and $r_o$. Based on these choices x is computed from equation 5, and conveniently x≧1 (otherwise the previous choices can be adjusted). Then, suitable values of s and ρ are found using equation 6. A range of values for ρ and s will yield desired $\lambda_c$. Typically, all values of ρ are larger than 0.224. In addition, the rule of equation 8 is used to further narrow the range of suitable values of ρ and s.

Finally, the values of s and ρ have an additional limitation. Namely, they must be selected so that core 12 of fiber 10 has a great enough loss, e.g., 100 dB/m or even 200 dB/m or more at a wavelength $\lambda > \lambda_c$. To find the loss at wavelength $\lambda > \lambda_c$, the fiber modes for light signals having a wavelength $\lambda > \lambda_c$ are required.

Equations (2), (3), and (4) specify the fundamental mode when $\lambda < \lambda_c$. When $\lambda > \lambda_c$, the function ψ is oscillatory, rather than exponentially decaying, in secondary cladding 16. Therefore when $\lambda > \lambda_c$, Eq. (4) is replaced by:

$$\psi = C J_0(qr) + D N_0(qr), \quad r \geq r_1 (\text{region III}) \tag{9}$$

where $N_0$ (also called $Y_0$) is the zeroth Neumann function, $q^2 = \kappa^2 - u_0^2 (2\pi/\lambda)^2$, and C and D are constants to be determined.

There are two key items to note regarding the modes for $\lambda > \lambda_c$. First, there are five unknowns (A, B, C, D, and κ) and four boundary conditions (continuity of ψ and dψ/dr at $r_0$ and $r_1$). The equations are underconstrained: κ may be chosen to be any value between 0 and $(2\pi/\lambda)\sqrt{u_0^2 + u_1^2}$. Thus, there is a continuum of states for each $\lambda > \lambda_c$, corresponding to the continuum of values that κ may have. This situation is quite different from the case $\lambda < \lambda_c$, where four unknowns (A, B, C, and κ) are fixed by the four boundary conditions, resulting in κ being a discrete eigenvalue having a unique value at each $\lambda < \lambda_c$.

Second, the modes specified by Eqs. (2), (3), and (9) are eigenmodes of the fiber, e.g. a W-fiber; however, these modes do not correspond to the situation that is physically realized. This is a result of Eq. (9) containing both incoming and outgoing waves, whereas in practice only outgoing waves are present (the light at wavelength $\lambda > \lambda_c$ originally propagating in core 12 radiates out).

Nevertheless, the modes of Eqs. (2), (3), and (9) can be used to estimate the losses at wavelengths greater than $\lambda_c$. First, for a given wavelength λ, find the value of κ that minimizes $C^2 + D^2$. This corresponds to the mode that is the most long-lived within the core. (An analogy can be made between the wave equation for the scalar ψ in the fiber and the quantum mechanical wave equation for a particle in a potential well. Then the quantum mechanical results can be borrowed. See for example David Bohm, "Quantum Theory", Dover 1989, Chapter 12 §14–22.

Second, once κ is found in the above manner, the outgoing waves can be computed from Eq. (9). These outgoing waves give a reasonable estimation of the loss from core 12 into secondary cladding 18, even when no incoming waves are present. These outgoing waves will cause beam at wavelength $\lambda > \lambda_c$ propagating in core 12 to be attenuated along the length of the fiber. If the beam has power P, then the change in power P with distance z along fiber 10 is described by the equation:

$$\frac{dP}{dz} = -\Lambda P. \tag{10}$$

The loss is given by the coefficient Λ, which is approximately:

$$\Lambda = \frac{\lambda}{4\pi^2 n_0} \frac{C^2 + D^2}{\int_0^{r_0} r \, dr \, \psi^* \psi}. \tag{11}$$

The loss Λ, having units of $m^{-1}$, can be converted to a loss β in units dB/m, using the relation:

$$\beta = 10 \log_{10}(e) \cdot \Lambda. \tag{12}$$

Here the term "loss" refers to light that leaks out of core 12 into secondary cladding 16. In fact, the light may not be truly lost from fiber 10 itself, if it remains in secondary cladding 16. In some cases this will be sufficient. In other cases light from secondary cladding 16 can be out-coupled, as necessary.

Another method for calculating the losses involves calculating the complex propagation constant of the leaky fundamental mode of fiber 10. Leaky modes are discussed in, for example, D. Marcuse, "Theory of Dielectric Optical Waveguides" (Academic, New York, 1974) Chapter 1. The loss is related to the imaginary part of the complex propagation constant of the leaky mode. The complex propagation constant, or its equivalent that is the complex effective index of refraction, may be computed using commercially available software, such as that obtainable from Optiwave Corporation of Nepean, ON, Canada.

In some cases it may be preferable to numerically solve for the modes of a given fiber rather than use the Bessel function approach outlined above, since real fibers do not have the idealized step index profile indicated by profile 20 shown in FIG. 1, but have variations from the ideal as shown by graph 20A in FIG. 2 of the actual refractive index profile obtained in practice. In particular, the most common method of single-mode fiber manufacture today involves the MOCVD process, which typically leaves an index dip in the center of core 12. Numerical solutions can, more easily than the method described above, take into account the actual variations in refractive index as a function of radius. Such numerical calculations can again give fundamental mode cutoff wavelength $\lambda_c$ and fiber losses as a function of fiber parameters including cross-sections and refractive indices, allowing fiber 10 to be designed to exhibit the desired features.

When Eq. (11) is used to estimate the loss, refractive indices $n_o$, $n_1$, and $n_2$ will in general be average indices of refraction of profile 20, since the actual indices of refraction will vary somewhat as a function of radius (see profile 20A). Also, the index of refraction n is not necessarily radially symmetric. If the cross section of fiber 10 is described by polar coordinates r and $\theta$ the refractive index may depend upon the angle $\theta$ as well as the radius r. Thus, n=n(r,$\theta$). Such an asymmetric fiber may be desirable for polarization maintenance, for example.

Here is the prerequisite for the fiber to have fundamental mode cutoff wavelength $\lambda_c$. Let R be a radius large enough that the index at radius R has substantially leveled off to the value $n_2$. Then fiber 10 will have fundamental mode cutoff wavelength $\lambda_c$ if (see B. Simon, Ann. Phys. 97 (1976), pp. 279):

$$\int_0^{2\pi} d\theta \int_0^R r dr (n^2(r,\theta) - n_2^2) \leq 0. \tag{13}$$

Note that given the profile of FIG. 1, Eq. (13) becomes:

$$\pi r_0^2 u_0^2 - \pi (r_1^2 - r_0^2) u_1^2 \leq 0, \tag{14}$$

which is equivalent to Eq. (7) above.

Fundamental mode cutoff wavelength $\lambda_c$ is the largest wavelength for which there is an eigenmode that is localized in region I. The losses for wavelengths above cutoff wavelength $\lambda_c$ can be determined, for example, by (i) solving for the modes that are not localized but include incoming and outgoing waves, (ii) for each wavelength finding the mode with the smallest outgoing intensity, and (iii) using this outgoing intensity to estimate the loss. As discussed above, other methods are also available to a person skilled in the art for calculating losses. In general, fiber 10 with a desired fundamental mode cutoff wavelength $\lambda_c$ and losses can therefore be designed by adjusting the profile n(r,$\theta$), which is equivalent to adjusting the cross-sections and refractive indices of core 12, depressed cladding 14 and secondary cladding 16. The rules presented above will enable a person skilled in the art to set fundamental mode cutoff wavelength $\lambda_c$ by making a selection of $r_o$, $r_1$, $n_o$, $n_1$ and $n_2$.

Referring back to FIG. 1, superposed on average index profile 20 is an intensity distribution of a guided fundamental mode 22 at a first wavelength $\lambda_1 < \lambda_c$. First wavelength $\lambda_1$ is contained within the S-band. A fundamental mode 24 that is no longer guided by fiber 10 is also superposed on index profile 20. Mode 24 is at cutoff wavelength $\lambda_c$. An intensity distribution of another mode 26 that is not guided by fiber 10 and exhibits an oscillating intensity distribution beyond core 12 and depressed cladding 14 is also shown. Light in mode 26 has a second wavelength $\lambda_2$, which is longer than cutoff wavelength $\lambda_c < \lambda_2$ and is contained in a long wavelength band, i.e., in the C- or L-band.

Figure 3:
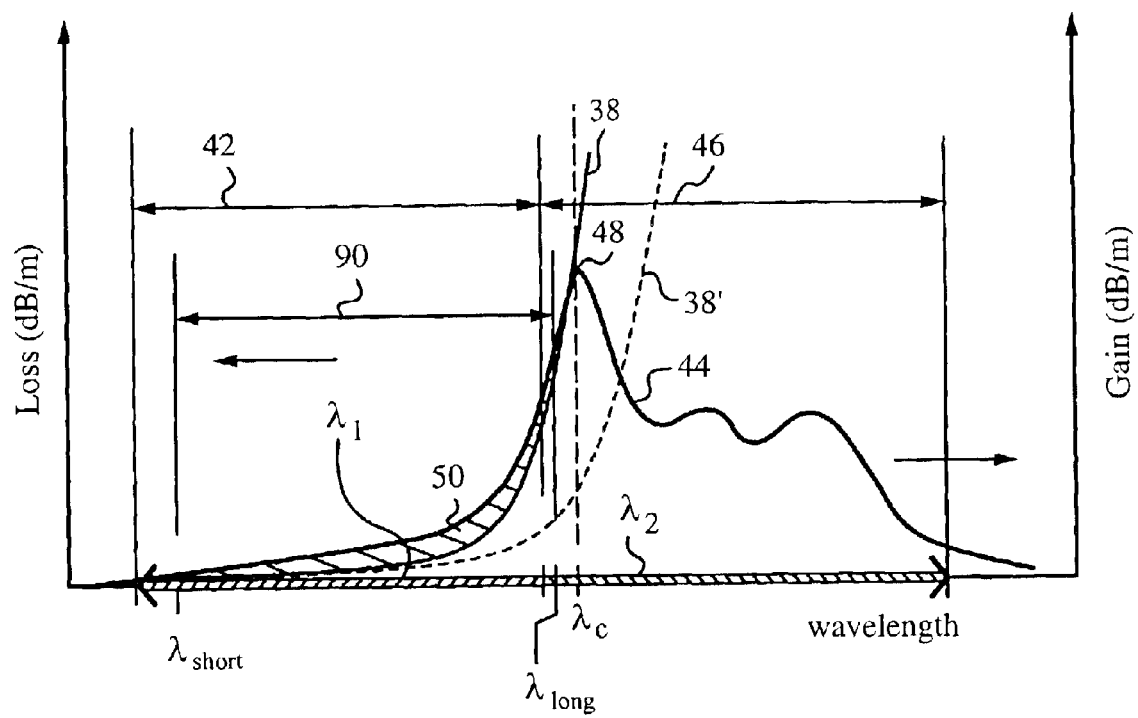
FIG. 3 illustrates a gain profile of Erbium when pumped to a high relative inversion D.

FIG. 3 illustrates a gain profile 44 of Erbium 18 when pumped to a high relative inversion D. The S-band is designated by reference 42, and long wavelength band is designated by reference 46. Gain profile 44 exhibits high gains in long wavelength band 46 and positive gains in S-band 42. In particular, high gains in long wavelength band 46 include a peak 48 at about 1530 nm that is very close to S-band 42.

In this embodiment the cross-sections or radii of core 12, depressed cladding 14 and refractive indices $n_o$, $n_1$, and $n_2$ are selected to place cutoff wavelength $\lambda_c$ right at peak 48. Additionally, the value of index $n_o$ of core 12 is selected to obtain a roll-off loss curve 38 about cutoff wavelength $\lambda_c$ set at peak 48 of high gains in long wavelength band 46. More particularly, roll-off loss curve 38 is selected to yield losses at least comparable to the high gains in long wavelength band 46 while yielding losses substantially smaller than the positive gains in S-band 42. Roll-off loss curve 38 drops below the positive gains indicated by profile 44 because of its rapid decrease or large positive slope to the left for wavelengths below cutoff wavelength $\lambda_c$. The gains thus exceed losses across entire S-band 42, as better visualized by hatched area 50. Preferably, roll-off loss curve 38 is such that the gains exceed the losses in S-band 42 by at least 5 dB. For more information on selecting appropriate roll-off loss curves the reader is referred to U.S. patent application Ser. No. 10/095,303 filed on Mar. 8$^{th}$, 2002.

Figure 4:
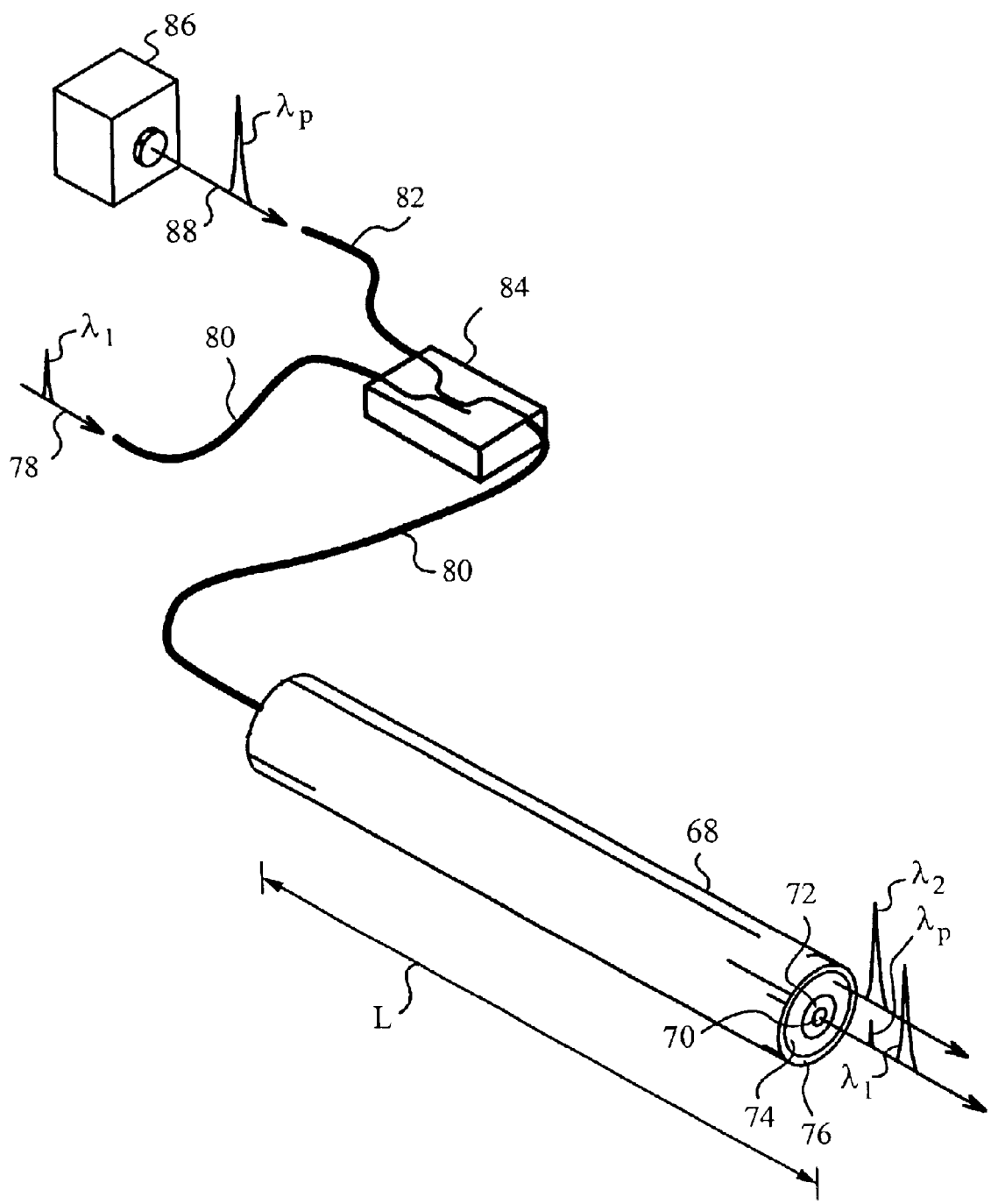
FIG. 4 is an isometric view of an EDFA in accordance with the invention.

W-profile Er-doped fiber 10 designed in accordance with the above rules finds its application as an amplifier 68 (EDFA) using alumino-germanosilicate glass as the host material, as shown in FIG. 4. EDFA 68 is doped with a concentration of 0.1% wt. of Er in a core 70 of index $n_o$. Core 70 is surrounded by a depressed cladding 72 of index $n_1$ and a secondary cladding 74 of index $n_2$. EDFA 68 has a protective jacket 76 surrounding secondary cladding 74 to offer mechanical stability and to protect EDFA 68 against external influences.

A signal light 78 at a first wavelength $\lambda_1$ contained within S-band 42 is delivered to EDFA 68 for amplification from a fiber 80. For example, signal light 78 can be an information-bearing signal requiring amplification.

Fiber 80 is coupled with a fiber 82 in a wavelength combiner 84. Fiber 82 is used to couple a pump light 88 from a pump source 86 to EDFA 68. Pump source 86, preferably a laser diode, provides pump light 88 at a pump wavelength $\lambda_p$ of about 980 nm for pumping the Er ions in core 70 to achieve a high level of relative population inversion D. Parameter D varies from D=−1 indicating no population inversion to D=1 signifying complete population inversion. When D=0, exactly half of the Er ions are in the excited energy state or manifold of states, while half remain in the ground energy manifold. In this case, EDFA 68 is approximately transparent (for wavelengths near the 3-level transition at 1530 nm). For non-uniformly inverted EDFAs, parameter D is considered as the average value of inversion. In the present embodiment, the intensity of pump light 88 is determined such that it ensures a relative inversion of D≧0.7 in the Er ions.

Pump light 88 and signal light 78 are combined in combiner 84 and both delivered to EDFA 68 by fiber 80. More particularly, both signal and pump light 78, 88 are coupled into core 70 from fiber 80.

Core 70 and claddings 72, 74 all have circular cross sections in this embodiment. The cross sections and indices $n_o$, $n_1$, $n_2$ are selected in accordance with the method of invention to set cutoff wavelength $\lambda_c$ near 1525 nm. In other words, cutoff wavelength $\lambda_c$ is selected to be between S-band 42 and long wavelength band 46 or the C-band and L-band.

It is important that index $n_o$ of core 70 be chosen to provide for a large negative slope in effective index $n_{eff}$ with respect to wavelength, preferably about 0.008/1,000 nm, near cutoff wavelength $\lambda_c$. As a result, the roll-off loss curve exhibits a rapid decrease for wavelengths below cutoff wavelength $\lambda_c$ ensuring that the losses in S-band 42 are lower than the positive gains. The losses produced by this roll-off loss curve increase rapidly for wavelengths larger than cutoff wavelength $\lambda_c$. Thus, the losses produced in the C- and L-bands 46 are at least comparable to the high gains.

Designing EDFA 68 in accordance with the invention will ensure that signal light 78 at $\lambda_1$ is amplified while ASE at any wavelength $\lambda_2$ in the C- and L-bands 66, and especially at $\lambda_2$=1530 nm is rejected into cladding 74 as shown. Positive gains in S-band 42 will typically be on the order of 5 dB above the losses and thus, to obtain sufficient amplification of signal light 78, EDFA 68 requires a certain length L. The smaller the difference between the positive gains and losses in the S-band 42, the longer length L has to be to provide for sufficient amplification of signal light 78.

Figure 5:
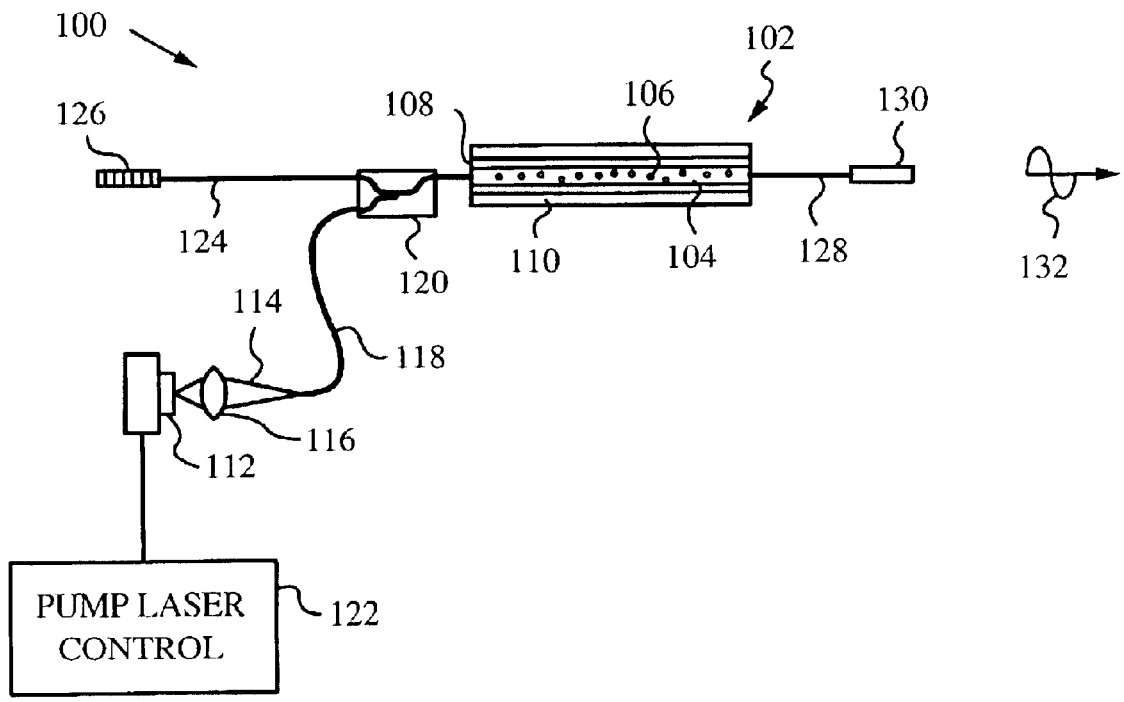
FIG. 5 is a diagram illustrating the use of an EDFA in a fixed narrowband source according to the invention.

FIG. 5 illustrates a source 100 of light in the S-band employing a fiber 102 doped with Erbium 106 and constructed to form an EDFA in accordance with the above principles. Specifically, fiber 102 has a core 104 doped with Erbium 106, a depressed cladding 108 surrounding core 104 and a secondary cladding 110 surrounding depressed cladding 108.

Source 100 has a pump source 112 for providing a pump light 114. Pump source 112 is preferably a diode laser emitting pump light 114 at a wavelength of about 980 nm. An optic 116 in the form of a lens is provided for coupling pump light 114 into a fiber 118. A coupler 120 is provided for coupling pump light 114 from fiber 118 into a fiber 124. Fiber 124 is joined to one end of fiber 102 in accordance with any suitable fiber splicing technique known to those skilled in the art such that fiber 124 delivers pump light 114 into core 104 of fiber 102.

Pump source 112 is controlled by a pump control 122 such that source 112 delivers pump light 114 for pumping Erbium 106 in core 104 to a high relative inversion D. The relative inversion D is sufficiently high when Erbium 106 exhibits positive gains in the S-band and high gains in the long wavelength band, i.e., the L- and C-bands. The cross-sections and refractive indices, $n_o$, $n_1$, $n_2$ of core 104, depressed cladding 108 and secondary cladding 110 are selected in accordance with the above rules. In particular, the cross-sections and refractive indices $n_o$, $n_1$, $n_2$ are selected to produce losses at least comparable to the high gains in the L- and C-bands and losses substantially smaller than the positive gains in the S-band.

Fiber 124 passes through coupler 120 and is terminated by a wavelength-selecting device 126. In the present embodiment device 126 is a wavelength-selecting feedback mechanism in the form of a fiber Bragg grating. Fiber Bragg grating 126 is a wavelength-selecting feedback mechanism because the portion of light that it is tuned to reflect propagates through fiber 124 back into fiber 102. Of course, other mechanisms can also be used. For example, another advantageous wavelength-selecting feedback mechanism is a tunable free-space diffraction grating configured to retro-reflect light at the desired output wavelength.

At its other end fiber 102 is joined with a fiber 128 that is terminated by an output coupler 130. Once again, any suitable fiber joining technique can be employed to join the end of fiber 102 to fiber 128. The junction is such that light propagating through core 104 of fiber 102 is freely coupled between fiber 102 and fiber 128. Output coupler 130 is any suitable optical coupling device for passing an output light 132. For example output coupler 130 can be a cleaved end of fiber 128, i.e., a cleaved output facet, a wavelength coupler, a free-space reflector, a fiber Bragg grating, a 2×2 fused fiber coupler used in conjunction with a broadband reflector. In fact, any output coupling device used to couple output light from a fiber laser can be used as output coupler 130 including a diffraction grating. In fact, as will be appreciated by a person skilled in the art, a diffraction grating can be used to serve the function of wavelength selecting device 126 and output coupler 130.

During operation pump laser control 122 is turned on to provide pump light 114 to fiber 102 such that Erbium 106 is pumped to a high relative inversion D. As a result, Erbium 106 exhibits positive gains in the S-band and high gains in the L- and C-bands. The selection of cross-sections and refractive indices $n_o$, $n_1$, $n_2$ of core 104, depressed cladding 108 and secondary cladding 110 in accordance with the invention cause losses at least comparable to the high gains in the L- and C-bands 46 and losses substantially smaller than the positive gains in S-band 42, as illustrated in the graph of FIG. 3. Therefore, fiber 102 exhibits a net optical gain spectrum that extends several tens of nanometers below fundamental mode cutoff wavelength $\lambda_c$ within S-band 42.

Once again referring to FIG. 3, a shortest wavelength $\lambda_{short}$ and a longest wavelength $\lambda_{long}$ for which the gain is positive define a net gain bandwidth 90. Shortest and longest wavelengths $\lambda_{short}$, $\lambda_{long}$ are determined by design parameters of fiber 102 including roll-off loss curve 38 below cutoff wavelength $\lambda_c$, doping concentration and distribution of Erbium 106 in core 104, and average degree of inversion D over the length of fiber 102. Changes in the length of fiber 102 do not impact shortest and longest wavelengths $\lambda_{short}$, $\lambda_{long}$ for which the gain is positive as long as inversion D remains constant. Changes in the length of fiber 102, however, impact the amount of gain within net gain bandwidth 90 contained between shortest and longest wavelengths $\lambda_{short}$, $\lambda_{long}$. On the other hand, changes in the power of pump light 114 and its direction as well as single-end or dual-end pumping directly affect the average degree of inversion D in fiber 102. The present embodiment employs single-end pumping in which pump light 114 and output light 132 are co-propagating (propagate in the same direction). Higher inversion D produces higher gain (or lower loss) at all wavelengths within S-band 42 and can also expand net gain bandwidth 90 between shortest and longest wavelengths $\lambda_{short}$, $\lambda_{long}$.

Now, even when fiber 102 does not receive a signal light for amplification (e.g., signal light 78 as illustrated in FIG. 4) it still creates an optical output. Unavoidable fluorescence also referred to as spontaneous emission (SE) occurs due to the natural radiative decay of excited (pumped) atoms of Erbium 106 back down to ground state. The spontaneous emission process happens in exact proportion to the spectrum of the "emission cross section" (often called the gain cross section, due to their correspondence). In fact, even if population inversion has not been achieved, spontaneous emission still occurs. Some of this spontaneous emission generates light within S-band 42, and some of this light overlaps with a mode guided by fiber 102. More specifically, some of the light produced by spontaneous emission is trapped in core 104 of fiber 102 and travels along its core 104 in a guided mode. Of that trapped light the portion that overlaps with net gain bandwidth 90 of fiber 102 is amplified. Light outside net gain bandwidth 90 is generally not amplified and is lost by direct attenuation, absorption by non-inverted atoms of Erbium 106 and loss to secondary cladding 110 among other. The light that is guided in core 104 and amplified by fiber 102 is called amplified spontaneous emission (ASE).

As will be appreciated by those skilled in the art, the spectral shape of the ASE is determined both by the spectral shape of the spontaneous emission (which is related to the emission cross section) and also by the spectral shape of the net gain bandwidth 90. Net gain bandwidth 90 is related to the emission cross section, absorption cross section, degree of inversion D and the spectral shape of the losses dictated by roll-off loss curve 38 produced by the selection of cross sections and refractive indices of fiber 102. However, the spectral shape of ASE is not merely the product of the spontaneous emission spectrum and the spectrum associated with net gain bandwidth 90, as would be expected if all of the spontaneous emission happened at one end of fiber 102 and all of the amplification occurred at a different location in fiber 102. Rather, the ASE output from fiber 102 is the superposition of the amplified bits of spontaneous emission originating at each and all locations within fiber 102.

In general, wavelengths at which there are high gains and high losses exhibits higher ASE power than wavelengths with low gains and low losses, even if the net gain is the same. Typically, due to the shape of the emission cross section of Erbium 106, longer wavelengths within net gain bandwidth 90 exhibit higher gains than shorter wavelengths. Also, typically, longer wavelengths exhibit higher losses than shorter wavelengths. The higher losses are due to the shape of the absorption cross section of Erbium 106 and the shape of roll-off loss curve 38. Hence, the ASE spectrum of S-band amplifier constituted by fiber 102 is often biased towards these longer wavelengths, even though the longest of these wavelengths may experience net loss. Typically, the shorter wavelengths of the ASE emission spectrum exhibit small positive net gains, through not much ASE power.

Figure 6:
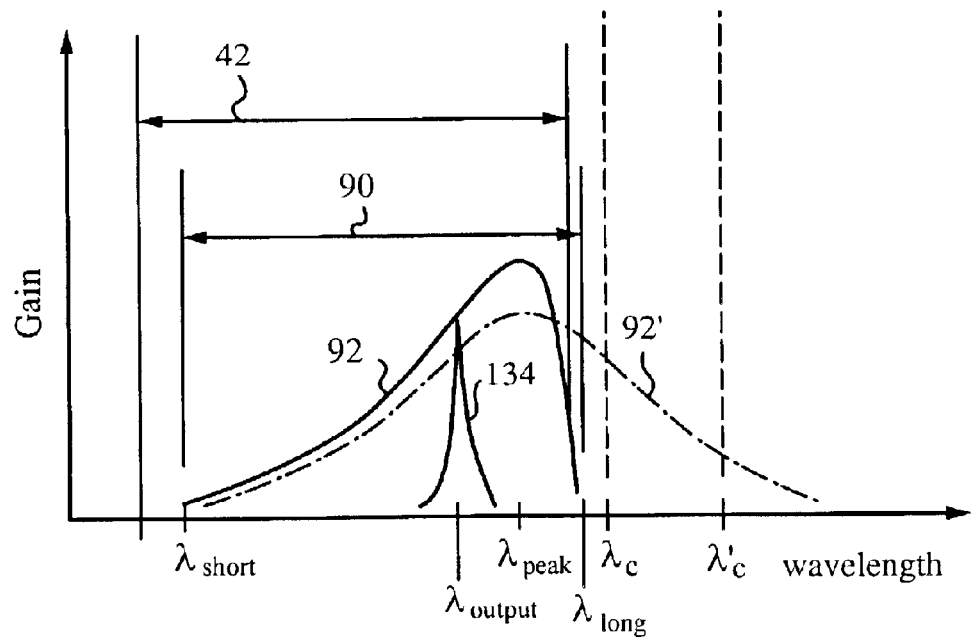
FIG. 6 is a graph illustrating the typical shaped of the ASE emission spectrum of the EDFA used in the source of FIG. 5.

As a result of the above phenomena the following rules should be observed when constructing source 100. First, one should select a peak wavelength $\lambda_{peak}$ within net gain bandwidth 90. Then, the cross sections and refractive indices of core 104, depressed cladding 108 and secondary cladding 110 should be selected to set cutoff wavelength $\lambda_c$ about 10–20 nm above $\lambda_{peak}$. The exact distance between $\lambda_{peak}$ and $\lambda_c$ should be adjusted depending on the steepness of roll-off loss curve 38. In particular, when roll-off loss curve 38 is steep then $\lambda_c$ should be set only about 10 nm above $\lambda_{peak}$. On the other hand, for a less steep roll-off loss curve 38' (see FIG. 3) a cutoff wavelength $\lambda'_c$ should be set up to 20 nm above $\lambda_{peak}$. The general shape of the ASE emission spectrum has the shape of the net gain spectrum within net gain bandwidth 90 as indicated by graph 92 for steep roll-off loss curve 38 and by graph 92' for less steep roll-off loss curve 38', as shown in FIG. 6.

Next, one should determine the desired power level and bandwidth of source 100. To obtain output light 132 at a high power level fiber 102 is lengthened. The doping concentration of Erbium 106 in core 104 can be kept the same or even increased to further aid in increasing the power level of light 132. Then, the power level of pump light 114 is increased, e.g., to obtain 100–200 dB absorption of pump light 114 in fiber 102. For example, pump light 114 is delivered at a power level such that fiber 102 absorbs up to 90% of pump light 114. On the other hand, to obtain output light 132 spanning a wide bandwidth, fiber 102 is kept short and the power level of pump light 114 is decreased.

Thus, there exists a tradeoff between power and bandwidth. This is because for the high gains and wide amplification bandwidths that can be achieved in doped EDFAs the ASE process is quite efficient. The typical way of further increasing the power of an EDFA is to pump harder and/or lengthen the EDFA. This approach works well up to a point. However, the fiber length and pumping cannot be increased as much as desired due to the high efficiency of the ASE process. Once a significant ASE power builds up in an EDFA, e.g., up to net gains of 40 dB, the ASE process begins to rob the population of Erbium atoms in the excited state, thereby reducing the degree of inversion D.

Reduced inversion D causes a reduction of spontaneous emission and a significantly reduced amount of net gain. The S-band EDFA is particularly sensitive to reductions in inversion D because of the unfavorable radio of emission cross section to absorption cross section within the S-band. This interplay between ASE and gain limits the available power and/or bandwidth of ASE within the S-band when a single EDFA section is used. Therefore, if sufficient power over the desired bandwidth cannot be achieved with fiber 102, then several fibers analogous to fiber 102 can be used in combination. Further details of such combinations are described below.

Now, as fiber 102 is being pumped by pump light 114 source 100 generates ASE emission spectrum 92 centered about peak wavelength $\lambda_{peak}$. Lasing operation of source 100 is obtained with the aid of fiber Bragg grating 126. Specifically, fiber Bragg grating 126 is set to reflect an output wavelength $\lambda_{output}$ within ASE emission spectrum 92. At the same time, output coupler 130 is set to pass a fraction of light 132 at wavelength $\lambda_{output}$. After many round trips between fiber Bragg grating 126 and output coupler 130, light at $\lambda_{output}$ dominates over ASE emission spectrum 92. Therefore, source 100 emits output light 132 having a narrowband spectrum 134 centered at wavelength $\lambda_{output}$ through output coupler 130. It should be noted that pump source control 122 can operate in a continuous mode or in a pulsed mode. Therefore, output light 132 can be delivered in pulses or continuously, as desired.

Figure 7:
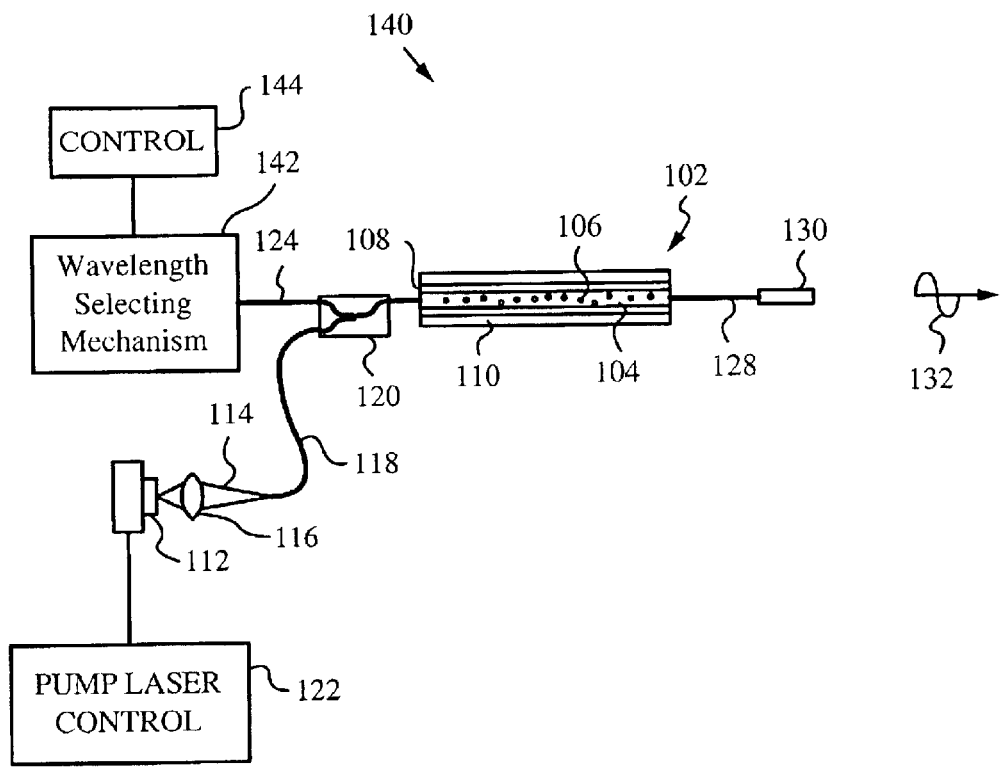
FIG. 7 is a diagram illustrating the use of an EDFA in an alternative source according to the invention.

FIG. 7 illustrates an alternative embodiment of a source 140 in which parts corresponding to those of source 100 are referenced by the same reference numerals. Source 140 differs from source 100 in that it has a wavelength selecting mechanism 142 and a control 144 for adjusting the wavelength reflected back to fiber 102 by mechanism 142. Wavelength selecting mechanism 142 is a wavelength filter such as a tilted etalon, a strain-tuned fiber Bragg grating, a temperature-tuned fiber Bragg grating, an interferometer, an array of waveguide gratings, a diffraction gratings or a tunable coupled cavity reflector. Correspondingly, control 144 is a mechanism for controlling stain, temperature, inclination angle or other required tuning parameter of filter 142, as will be appreciated by a person skilled in the art.

By controlling the wavelength band reflected by filter 142 an output wavelength $\lambda_{output}$ of light 132 is selected as in source 100. Of course, output coupler 130 is adjusted to pass light 132 at the selected output wavelength $\lambda_{output}$. It should be noted that one can also select several output wavelengths within ASE emission spectrum 92 (see FIG. 6).

Alternatively or in combination with output wavelength selection performed with the aid of filer 142, pump source control 122 of source 140 can also be used to adjust the output wavelength of light 132 by tuning the level of relative inversion D. This is achieved by tuning the power delivered by control 122 to pump source 112. Changing the power level applied to pump source 112 adjusts the intensity of pump light 114, hence tuning the level of relative inversion D, as will be appreciated by a person skilled in the art.

Figure 8:
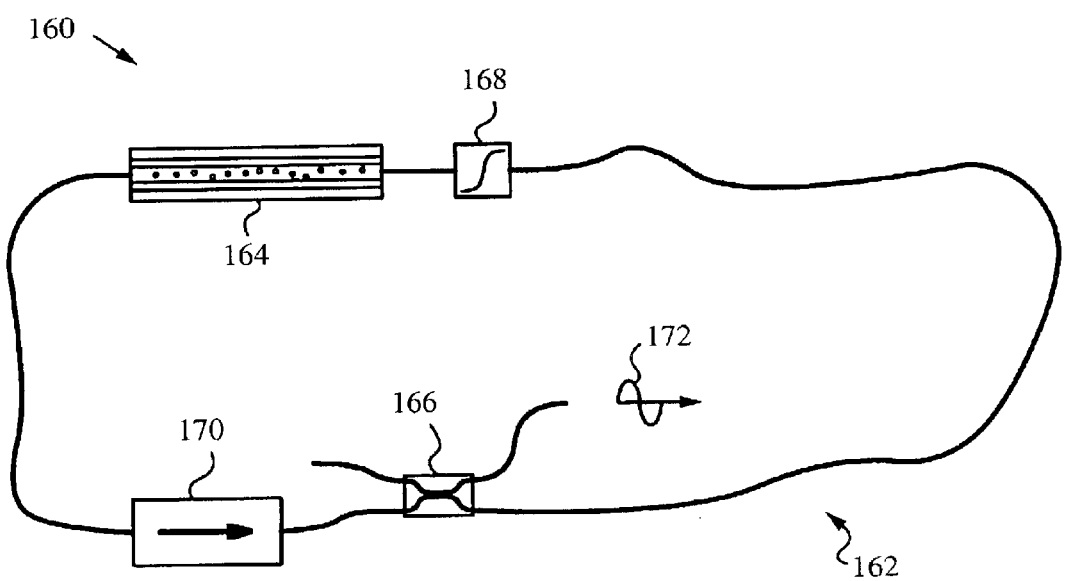
FIG. 8 is a diagram illustrating a source using a single EDFA in a ring cavity.

FIG. 8 illustrates a preferred embodiment of a source 160 according to the invention using a single EDFA 164. Source 160 does not require the use of reflectors by virtue of having a fiber ring cavity 162 with an output coupler 166. In this embodiment, a wavelength filter 168 installed in ring cavity 162 serves as a wavelength selecting mechanism. Filter 168 can be an adjustable filter, preferably a diffraction grating used in conjunction with an optical circulator or a temperature controlled fiber Bragg grating with a suitable control mechanism (not shown), an acousto-optic transmission filter (AOTF) or even a tunable etalon. Fiber ring cavity 162 also has an isolator 170 for controlling back-reflections and preventing output light 172 containing the light fraction at $\lambda_{output}$ or the ASE from propagating in both directions around ring 162. During operation EDFA 164 is pumped by a pump source (not shown) and operated in accordance with the principles described above.

Figure 9:
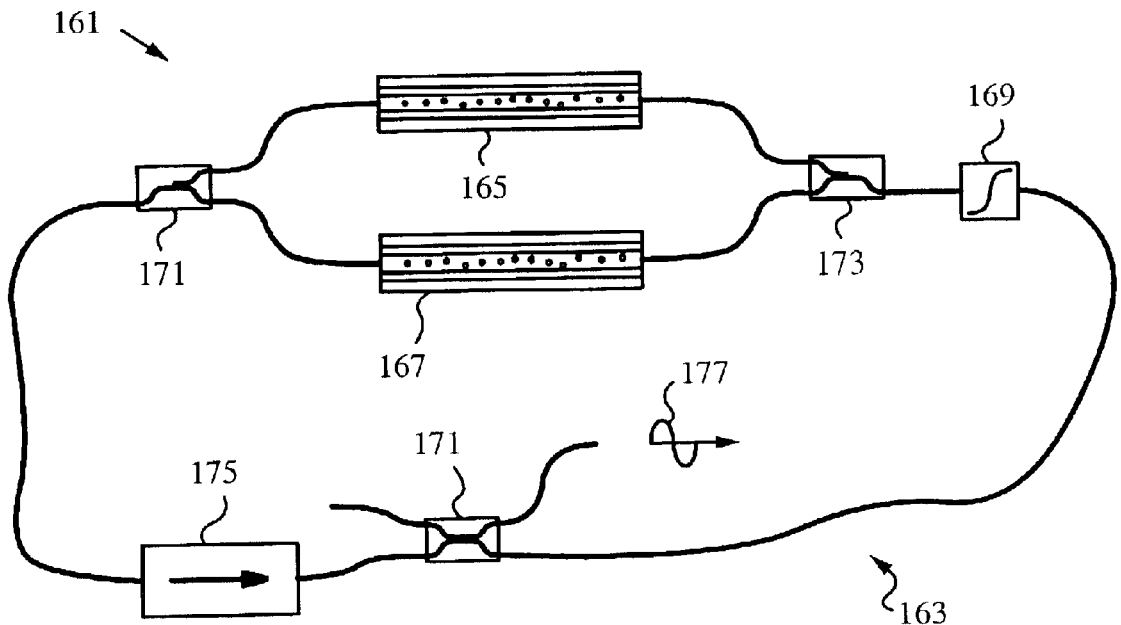
FIG. 9 is a diagram illustrating a source using two EDFAs in a parallel configuration in a ring cavity.

FIG. 9 illustrates a source 161 also using a fiber ring cavity 163. In order to obtain a broader ASE emission spectrum, source 161 employs two EDFAs 165, 167 connected in parallel between two couplers 171, 173. A third coupler 171 is employed for deriving output light 177 from ring cavity 163. The pump sources providing pump light to EDFAs 165, 167 are not shown in this embodiment for reasons of clarity.

EDFAs 165, 167 have different ASE emission spectra. These ASE emission spectra can be controlled by any of the above-discussed mechanisms, including different fiber parameters (cross sections, refractive indices and roll-off loss curves), lengths and inversion levels set by the intensity of pump light (not shown). Preferably, the ASE emission spectra of EDFAs 165, 167 are chosen to have their peak wavelengths at different locations within the S-band to thus span a wider total ASE emission spectrum. Thus, source 161 is able to provide a broader ASE emission spectrum and offers a wider range of wavelengths within which the output wavelength $\lambda_{output}$ is selected by filter 169. Furthermore, source 161 also has an isolator 175 for controlling back-reflections and preventing output light 177 containing the light fraction at $\lambda_{output}$ or the ASE from propagating in both directions around ring cavity 161.

During operation wavelength filter 169 sets output wavelength $\lambda_{output}$ of light 177 within the total ASE emission spectrum provided by EDFAs 165, 167. Light 177 is outcoupled from ring cavity 163 through output coupler 171, as shown. It should be noted that more than two EDFAs can be used to cover a still broader ASE emission spectrum. In fact, filter 169 can be left out completely in some embodiments to outcouple light 177 covering the wide bandwidth afforded by the parallel-configured EDFAs thus yielding a broadband source.

It should be noted that source 161 can be easily adapted to cover more than just the S-band. For example, another EDFA covering the C- or L-band of wavelengths, or in fact several additional EDFAs, can be connected in parallel with EDFAs 165 and 167 and their outputs combined.

Figure 10:
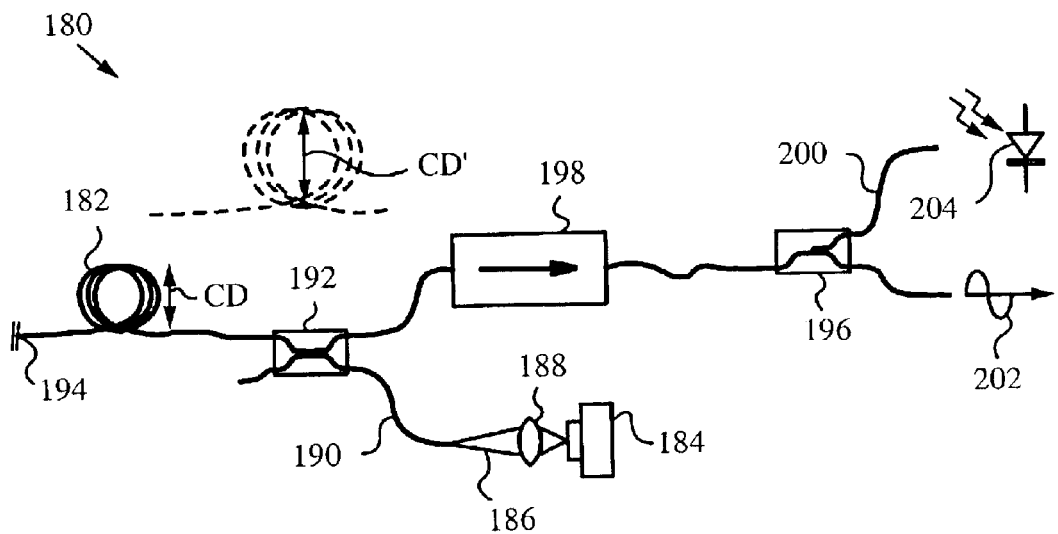
FIG. 10 is a diagram illustrating a source using an EDFA's coiling diameter for output wavelength tuning.

FIG. 10 illustrates yet another embodiment of a source 180 that uses a single EDFA 182. Source 180 has a pump source 184 for providing pump light 186. A lens 188 focuses pump light 186 into a fiber 190, which is coupled to EDFA 182 by a coupler 192.

EDFA 182 is coiled at a constant coiling diameter CD. To provide for mechanical stability, EDFA 182 can be coiled about a spool of diameter CD (not shown). In fact, the strain introduced into EDFA 182 by coiling diameter CD serves as the wavelength-selecting mechanism in this embodiment. That is because coiling diameter CD produces a desired ASE emission spectrum in EDFA 182. Specifically, selecting a larger coiling diameter CD, e.g., CD' as indicated, shifts the maximum of the ASE emission spectrum of EDFA 182 to longer wavelengths within the S-band.

EDFA 182 is terminated by an angle cleaved facet 194 or other non-reflective termination that prevents back reflection for better stability of source 180. Thus, angle cleaved facet 194 ensures that a sufficient amount of stable and low-noise output light 202 is emitted by EDFA 182 to an output coupler 196. An isolator 198 is interposed between EDFA 182 and output coupler 196 to prevent back-coupling of light 202 into EDFA 182.

In this embodiment output coupler 196 has an additional tap 200 for deriving a small amount of output light 202, e.g. about 1%, for output monitoring. A photodetector 204, in this case a photodiode, is provided for measuring tapped output light 202.

Source 180 can be used as a fixed source or as a tunable source. In particular, source 180 can be rendered tunable by providing a mechanism for altering coiling diameter CD. Alternatively, source 180 can be rendered broadband by widening the ASE emission spectrum of EDFA 182, e.g., by selecting a less steep roll-off loss curve, as discussed above.

It should be noted that source 180 employs a counter-propagating pumping geometry where pump light 186 is injected from a direction opposite to the direction in which output light 202 is derived from EDFA 182. This approach is preferred to co-pumping arrangements used in the above-described embodiments where the pump light is delivered along the same direction as the direction along which output light is derived.

Figure 11:
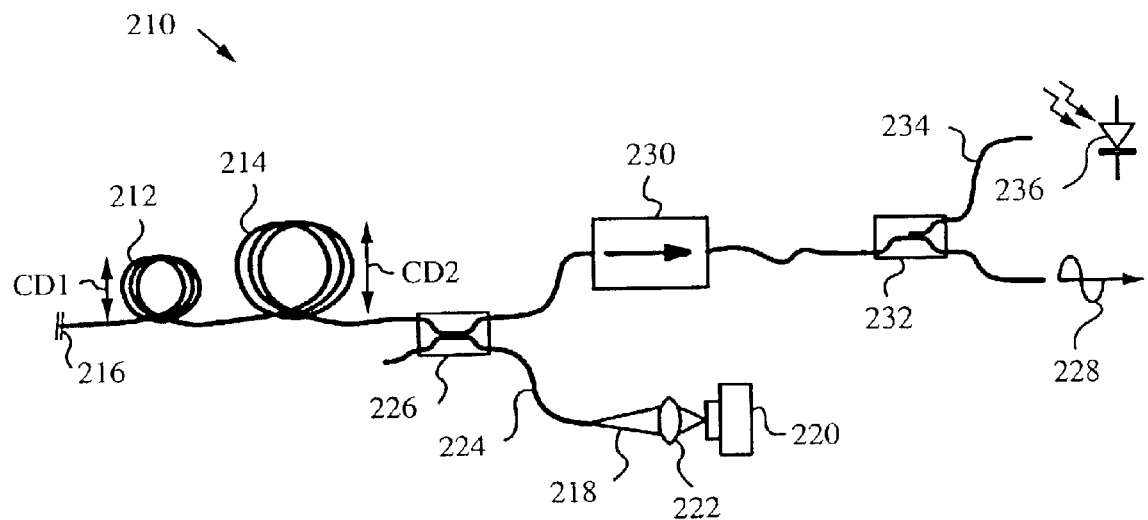
FIG. 11 is a diagram illustrating a source using two fiber sections in accordance with the invention.

A preferred embodiment of a source 210 is shown in FIG. 11. Source 210 uses two EDFA sections (which may or may not belong to the same piece of fiber) specifically a first section 212 and a second section 214. These two sections have different ASE emission spectra. In this case the ASE emission spectra are set by first and second coiling diameters CD1 and CD2 of sections 212, 214 respectively. Specifically, first section 212 has a smaller coiling diameter and second section 214 has a larger coiling diameter, CD1<CD2. Thus, the maximum of ASE emission spectrum of first section 212 is at a shorter peak wavelength $\lambda_{peak}$ than the maximum of ASE emission spectrum of second section 214.

As in the previous embodiment, an angle cleaved facet 216 prevents back reflection of output light 228. EDFA sections 212, 214 are pumped by pump light 218 delivered from a pump source 220 in a counter-propagating pumping arrangement. In particular, pump light 218 is focused by a lens 222 into a fiber 224 and a coupler 226 couples pump light 218 from fiber 224 into EDFA sections 212, 214.

An isolator 230 ensures that output light 228 is not coupled back into EDFA sections 212, 214. An output coupler 232 is provided for outcoupling output light 228. Output coupler 232 has a tap 234 for tapping a small portion of output light 228 and a photodetector 236 for monitoring the tapped portion of output light 228.

It is important to note that in source 210 first section 212 is positioned before second section 214 such that first section 212 seeds second section 214. In other words, the ASE from first section 212 propagates into second section 214 and output light 228 is derived from second section 214. The reasons for this arrangement is that second section 214 offers positive net gain for light at wavelengths generated by first section 212. First section 212, however, does not offer positive net gain and hence does not amplify light at wavelengths generated by second section 214. In other words, first section 212, which emits light centered around a shorter peak wavelength $\lambda_{peak}$ can be used to seed second section 214 but not vice versa. Still differently put, the two-coil design of source 210 does not cause significant depletion of inversion D in second section 214, while reversing the order of sections 212 and 214 would and would hence degrade the operation of source 210.

Figure 12:
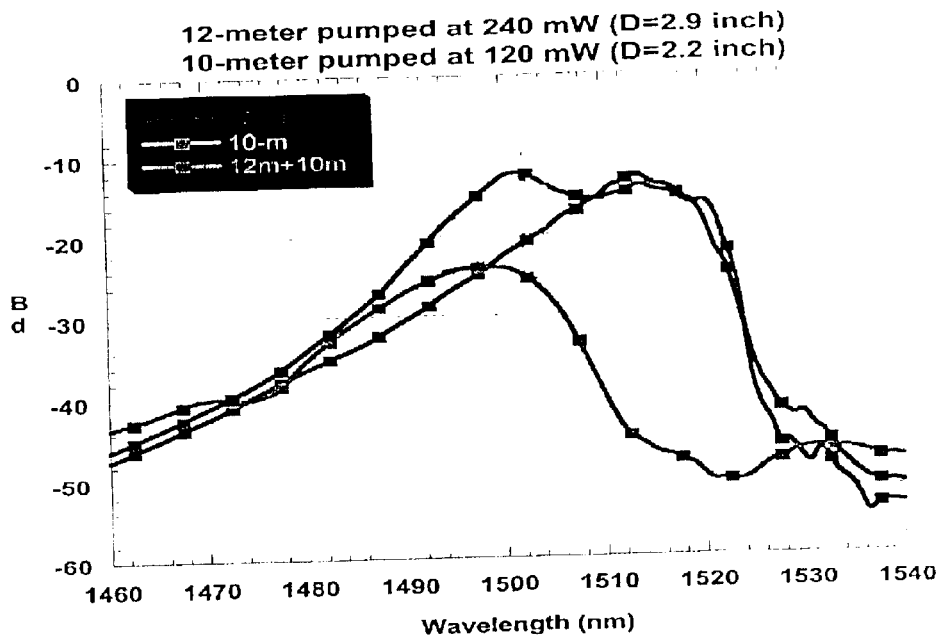
FIG. 12 is a graph illustrating the effects of seeding EDFA having a longer wavelength emission spectrum by an EDFA having a shorter wavelength emission spectrum.

FIG. 12 illustrates the ASE emission spectrum of first section 212 at first coiling diameter CD1=2.2 inches and of second section 214 at second coiling diameter CD2=2.9 inches. FIG. 12 also shows the total ASE emission spectrum obtained when section 212 seeds second section 214.

Figure 13:
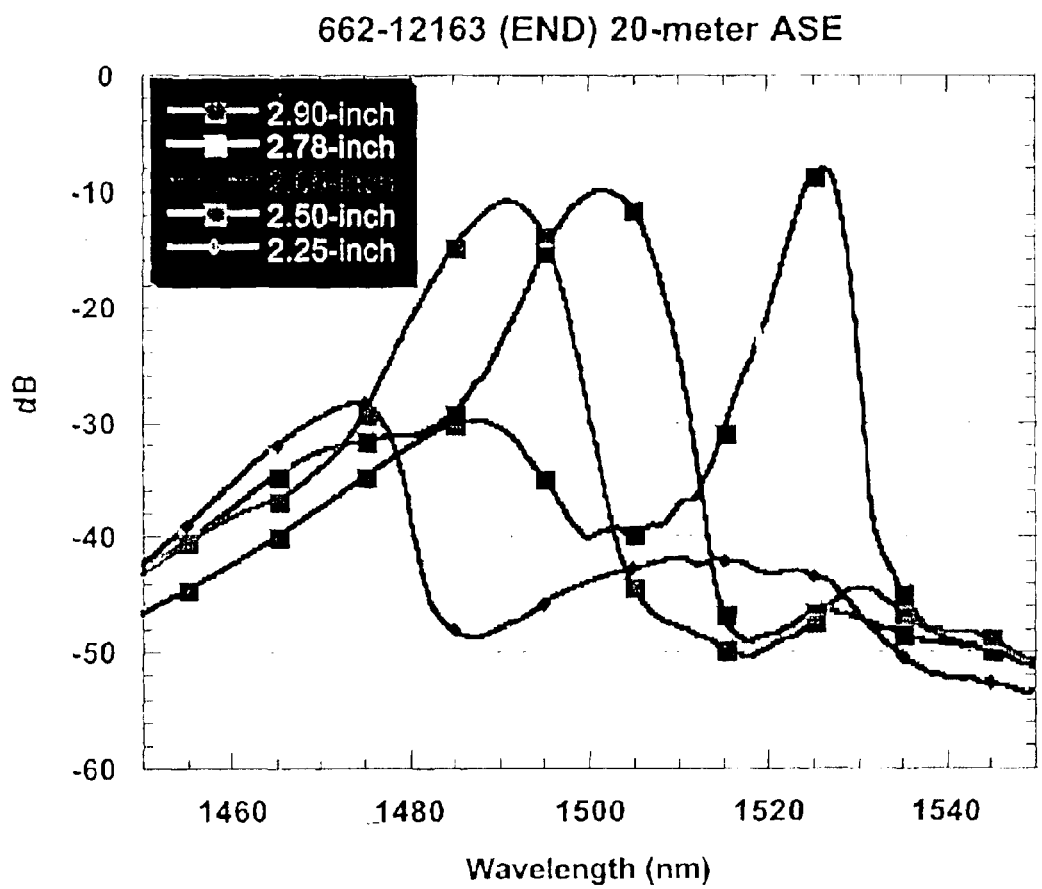
FIG. 13 is a graph illustrating the ASE emission spectra for EDFAs at several coiling diameters.

Based on the above principle, a number of EDFAs of different coiling diameters can be used in series from smallest diameter (shortest peak wavelength $\lambda_{peak}$) to largest diameter (longest peak wavelength $\lambda_{peak}$) to construct a still broader bandwidth source in accordance with the invention. FIG. 13 illustrates ASE emission spectra of five EDFAs having increasing coiling diameters ranging from 2.25 inches to 2.90 inches. Using these EDFAs in series makes it possible to construct a source spanning a wavelength range covering most of the S-band, i.e., from about 1460 nm to about 1525 nm.

Yet another method for broadening the ASE emission spectrum of an EDFA is by providing a continuously variable coiling diameter CD along the length of the EDFA. The coiling diameter should be increasing for seeding reasons, as explained above. A continuously variable coiling diameter can be produced, e.g., by winding the EDFA around a cone.

Figure 15:
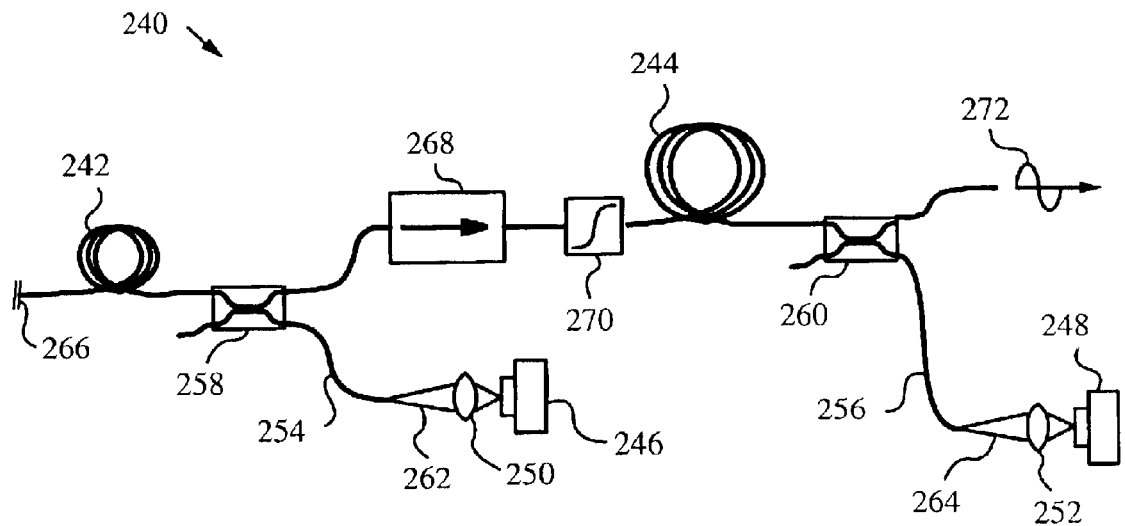
FIG. 15 is a diagram of a source with two EDFAs having different coiling diameters separated by an isolator.

FIG. 15 illustrates yet another embodiment of a source 240 employing an EDFA having a first section 242 and a second section 244. First section 242 has a smaller first coiling diameter and is used to seed second section 244 having a larger second coiling diameter. Source 240 has two separate pump sources 246, 248 with associated lenses 250, 252, fibers 254, 256 and couplers 258, 260 for delivering pump light 262 to first section 242 and pump light 264 to second section 244.

Source 240 has an angle cleaved facet 266 terminating first section 242. Source 240 employs an isolator 268 between first section 242 and second section 244 for stabilization. A tunable filter 270 installed after isolator 268 and before second section 244 is used to tune output wavelength $\lambda_{output}$ of output light 272. Conveniently, coupler 260 is used as output coupler for light 272 in this embodiment.

Figure 14:
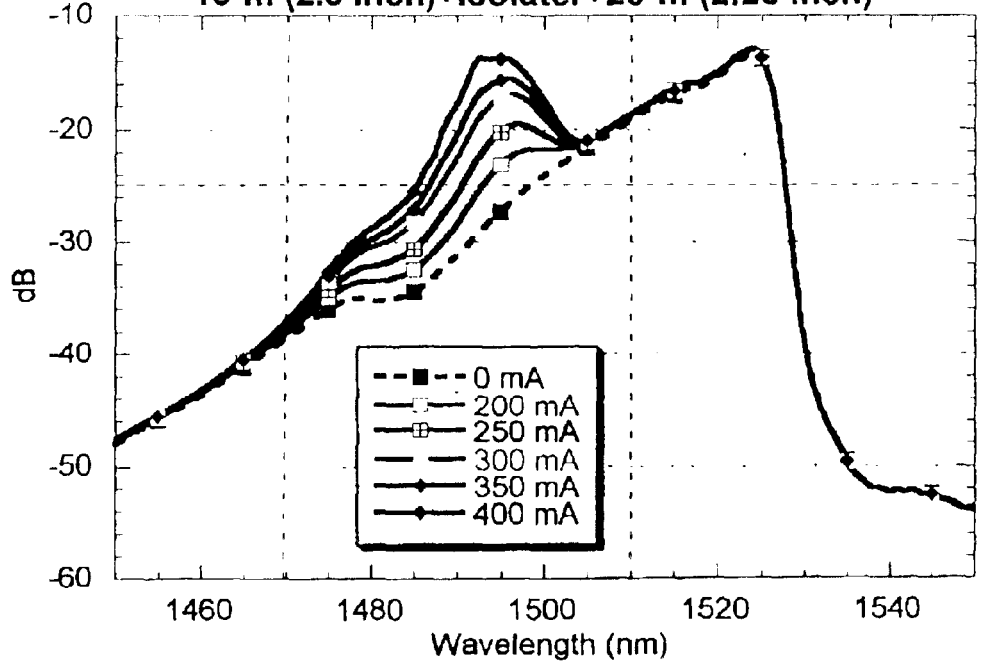
FIG. 14 is a graph illustrating the effect of using different pump power levels in two EDFA sections separated by an isolator on the total ASE emission spectrum.

Source 240 enables the operator to quickly and easily adjust the levels of pump power delivered by pump light 262 and 264 to sections 242 and 244 for tuning of output light 272. In fact, FIG. 14 illustrates how the use different levels of pump power in first and second sections 242, 244 tunes the total ASE emission spectrum for coiling diameters of first and second sections 242, 244 equal to 2.25 and 2.5 inches respectively.

Figure 16:
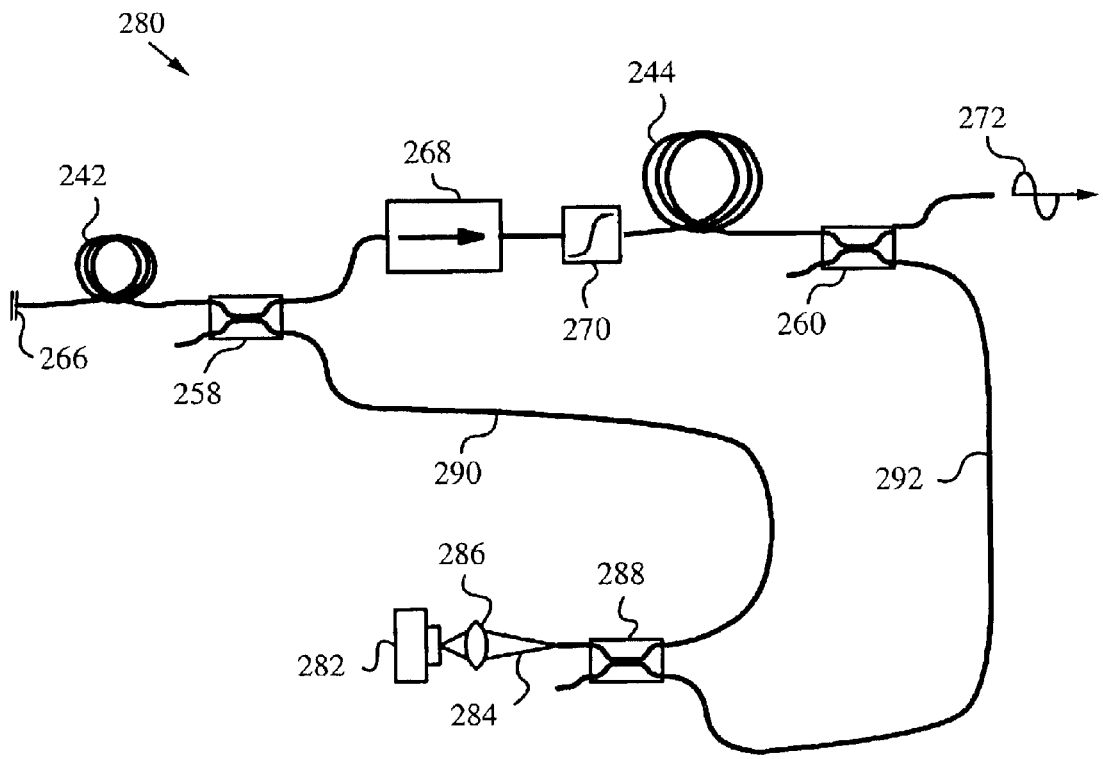
FIG. 16 is a diagram of a source with two EDFAs having different coiling diameters and employing a single pump source.

FIG. 16 illustrates a source 280 employing a similar arrangement as source 240. Corresponding parts of source 280 are referenced by the same reference numerals. Source 280 uses a single pump source 282 for delivering pump light 284 to both sections 242, 244. This is done with the aid of lens 286, coupler 288 and fibers 290, 292 as shown. The coupling ratio of coupler 288 between fibers 290 and 292 can be adjusted to control the levels of pump power delivered by pump light 284 to section 242 and section 244. The methods to adjust this coupling ratio are well-known to those skilled in the art.

Figure 17:
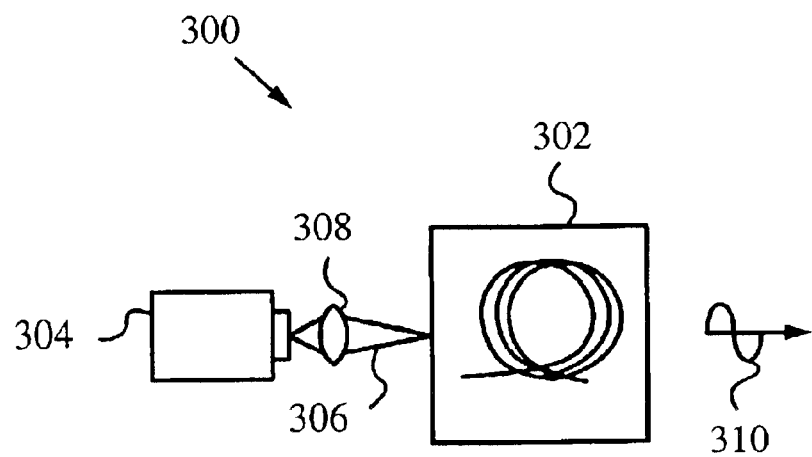
FIG. 17 is a diagram illustrating an S-band source using a master oscillator.

Of course, an EDFA in accordance with the invention can also be seeded by other means than a preceding EDFA section. FIG. 17 illustrates in a simplified diagram a source 300 in which an EDFA 302 is seeded by a master oscillator 304. Master oscillator 304 can be any suitable source such as a distributed feedback laser, Fabry-Perot laser, external cavity diode laser, distributed Bragg reflector laser, vertical cavity surface emitting laser, semiconductor laser, a fiber laser or a broadband source. Input light 306 from master oscillator 304 is coupled into EDFA 302 by a lens 308. Output light 310 can be derived directly from EDFA 302 or with the aid of any suitable output coupling mechanism.

Alternatively, the sections of EDFA fiber in any of the preceding embodiments using coiling diameter to control the ASE emission spectrum and the peak wavelength can take advantage of appropriate selection of core cross-section, depressed cladding cross-section, and refractive indices $n_o$, $n_1$, and $n_2$. Specifically, in the first section a first cutoff wavelength $\lambda_{c1}$ is produced by appropriate selection of these parameters. In the second section a second cutoff wavelength $\lambda_{c2}$ longer than said first cutoff wavelength $\lambda_{c1}$ is produced. Then, the first section is positioned before the second section for seeding the second section in the same manner as discussed above. Preferably, an isolator is positioned between these two sections. Of course, an additional adjustment of the ASE emission spectrum of the two sections can be performed by coiling the first and second sections as necessary.

Figure 18:
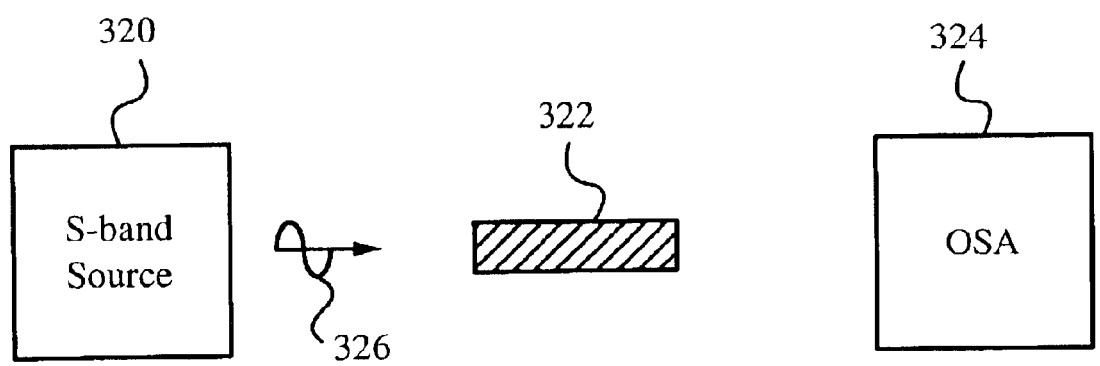
FIG. 18 is a diagram illustrating the use of an S-band source in a testing or measuring application in accordance with the invention.

FIG. 18 illustrates the use of a source 320 according to the invention to test a device under test 322 (DUT) for performance characteristics in the S-band. An optical spectrum analyzer 324 is provided to measure the response of DUT 322. Source 320 generates test light 326 by using any of the above described configurations. Light 326 can span a wide band or be tuned to a particular output wavelength $\lambda_{output}$, as required for testing DUT 322.

It will be clear to one skilled in the art that the above embodiments may be altered in many ways without departing from the scope of the invention. Accordingly, the scope of the invention should be determined by the following claims and their legal equivalents.

What is claimed is:

1. A source of light in an S-band of wavelengths comprising:
   a) a fiber having:
      1) a core doped with Erbium and having a core cross-section and a refractive index $n_o$;
      2) a depressed cladding surrounding said core, said depressed cladding having a depressed cladding cross-section and a refractive index $n_1$;
      3) a secondary cladding surrounding said depressed cladding, said secondary cladding having a secondary cladding cross-section and a refractive index $n_2$;
   b) a pump source for pumping said Erbium contained in said core to a high relative inversion D, such that said Erbium exhibits positive gains in said S-band and high gains in a long wavelength band longer than said S-band;

wherein said core cross-section, said depressed cladding cross-section, and said refractive indices $n_o$, $n_1$, and $n_2$ are selected to produce losses at least comparable to said high gains in said long wavelength band and losses substantially smaller than said positive gains in said S-band.

2. The source of claim 1, further comprising a wavelength-selecting means for selecting an output wavelength of said light.

3. The source of claim 2, wherein said wavelength-selecting means comprises a wavelength-selecting feedback mechanism.

4. The source of claim 3, wherein said wavelength-selecting feedback mechanism comprises a fiber Bragg grating.

5. The source of claim 2, wherein said wavelength-selecting means consists of a filter selected from the group consisting of tilted etalons, strain-tuned fiber Bragg gratings, temperature-tuned fiber Bragg gratings, interferometers, arrays waveguide gratings, diffraction gratings and tunable coupled cavity reflectors.

6. The source of claim 2, wherein said wavelength-selecting means comprises a pump source adjustment for tuning said high relative inversion D.

7. The source of claim 2, wherein said wavelength-selecting means comprises a coiling diameter of said fiber.

8. The source of claim 7, wherein said coiling diameter is continuously variable.

9. The source of claim 1, further comprising a master oscillator for seeding said fiber.

10. The source of claim 9, wherein said master oscillator is an optical source selected from the group consisting of distributed feedback laser, Fabry-Perot laser, external cavity diode laser, distributed Bragg reflector laser, vertical cavity surface emitting laser, semiconductor laser, a fiber laser, a broadband source.

11. The source of claim 1, wherein said fiber comprises:
    a) a first section having a first coiling diameter; and
    b) a second section having a second coiling diameter larger than said first coiling diameter.

12. The source of claim 11, wherein said first section is positioned before said second section for seeding said second section.

13. The source of claim 12, further comprising an isolator installed between said first section and said second section.

14. The source of claim 1, wherein said fiber comprises:
    a) a first section wherein said core cross-section, said depressed cladding cross-section, and said refractive indices $n_o$, $n_1$, and $n_2$ are selected to produce a first cutoff wavelength $\lambda_{c1}$;
    b) a second section wherein said core cross-section, said depressed cladding cross-section, and said refractive indices $n_o$, $n_1$, and $n_2$ are selected to produce a second cutoff wavelength $\lambda_{c2}$ longer than said first cutoff wavelength $\lambda_{c1}$.

15. The source of claim 14, wherein said first section is positioned before said second section for seeding said second section.

16. The source of claim 15, further comprising an isolator installed between said first section and said second section.

17. The source of claim 1, wherein said pump source comprises a laser diode providing pump light at about 980 nm.

18. The source of claim 1, further comprising an optical cavity for containing said fiber.

19. The source of claim 18, wherein said optical cavity is a ring cavity.

20. A method for generating light in an S-band of wavelengths comprising:
    a) providing a fiber having a core doped with Erbium and having a core cross-section and a refractive index $n_o$;
    b) surrounding said core with a depressed cladding having a depressed cladding cross-section and a refractive index $n_1$;
    c) surrounding said depressed cladding with a secondary cladding having a secondary cladding cross-section and a refractive index $n_2$;
    d) pumping said Erbium contained in said core to a high relative inversion D, such that said active material exhibits positive gains in said S-band and high gains in a long wavelength band longer than said S-band;
    wherein said core cross-section, said depressed cladding cross-section, and said refractive indices $n_o$, $n_1$, and $n_2$ are selected to produce losses at least comparable to said high gains in said long wavelength band and losses substantially smaller than said positive gains in said S-band.

21. The method of claim 20, wherein said step of pumping comprises counter-propagating pumping.

22. The method of claim 20, further comprising seeding said fiber.

23. The method of claim 22, wherein said fiber comprises a first section and a second section, and said method comprises seeding said second section by said first section.

24. The method of claim 20, wherein said pumping is performed in a pulsed mode.

25. The method of claim 20, wherein said light in said S-band is combined with a light outside said S-band.

* * * * *